US011337197B2

(12) United States Patent
Vutukuri et al.

(10) Patent No.: US 11,337,197 B2
(45) Date of Patent: May 17, 2022

(54) METHOD AND APPARATUS FOR SIMULTANEOUS USE OF BOTH LICENSED AND UNLICENSED WIRELESS SPECTRUM

(71) Applicant: BlackBerry Limited, Waterloo (CA)

(72) Inventors: Eswar Vutukuri, Havant (GB);
Nicholas William Anderson, Exeter (GB); Stephen John Barrett, Haywards Heath (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/382,922

(22) Filed: Apr. 12, 2019

(65) Prior Publication Data

US 2019/0246379 A1     Aug. 8, 2019

Related U.S. Application Data

(63) Continuation of application No. 14/479,985, filed on Sep. 8, 2014, now Pat. No. 10,292,142.

(51) Int. Cl.
| | |
|---|---|
| *H04W 72/04* | (2009.01) |
| *H04W 36/00* | (2009.01) |
| *H04W 88/06* | (2009.01) |
| *H04W 84/12* | (2009.01) |

(52) U.S. Cl.
CPC ..... *H04W 72/042* (2013.01); *H04W 36/0066* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 10,292,142 B2 | 5/2019 | Vutukuri et al. | |
| 10,560,846 B2 | 2/2020 | Vutukuri et al. | |
| 2008/0259885 A1 | 10/2008 | Faulkner et al. | |
| 2009/0041246 A1 | 2/2009 | Kitazoe | |
| 2009/0092248 A1 | 4/2009 | Rawson | |
| 2012/0284785 A1 | 11/2012 | Salkintzis | |
| 2013/0088983 A1 | 4/2013 | Pragada et al. | |

(Continued)

FOREIGN PATENT DOCUMENTS

WO     2013152483 A1     10/2013

OTHER PUBLICATIONS

Advisory Action dated Feb. 21, 2019 issued for U.S. Appl. No. 14/480,058.

(Continued)

*Primary Examiner* — Yaotang Wang
(74) *Attorney, Agent, or Firm* — Conley Rose, P. C.; J. Robert Brown, Jr.

(57) ABSTRACT

A control circuit determines that a wireless portable electronic device currently being serviced via licensed wireless spectrum should also be served via unlicensed wireless spectrum and then transmits a Radio Resource Control (RRC) message to cause the wireless portable electronic device to connect to a network node operating in the unlicensed wireless spectrum. By one approach this control circuit comprises an Evolved Node-B base station in a Long Term Evolution (LTE) Radio Access Network (RAN) and the network node operating in the unlicensed wireless spectrum comprises an 802.11-compatible wireless local area network node.

15 Claims, 15 Drawing Sheets

(56) References Cited

U.S. PATENT DOCUMENTS

| | | | |
|---|---|---|---|
| 2013/0155931 A1 | 6/2013 | Prajapati et al. | |
| 2014/0086211 A1 | 3/2014 | Liu | |
| 2014/0098789 A1* | 4/2014 | Liu | H04W 36/0022 |
| | | | 370/331 |
| 2014/0177840 A1 | 6/2014 | Liu | |
| 2014/0204927 A1* | 7/2014 | Horn | H04W 8/06 |
| | | | 370/338 |
| 2014/0293970 A1 | 10/2014 | Damnjanovic et al. | |
| 2014/0323131 A1 | 10/2014 | Yun | |
| 2015/0036506 A1* | 2/2015 | Jiang | H04W 92/20 |
| | | | 370/237 |
| 2015/0085659 A1 | 3/2015 | Hong et al. | |
| 2015/0296490 A1 | 10/2015 | Yi et al. | |
| 2015/0350988 A1* | 12/2015 | Himayat | H04W 12/0401 |
| | | | 370/331 |
| 2015/0358237 A1 | 12/2015 | Persson et al. | |
| 2016/0044567 A1* | 2/2016 | Baghel | H04M 15/00 |
| | | | 370/331 |
| 2016/0119862 A1 | 4/2016 | Rinne et al. | |
| 2017/0177840 A1 | 6/2017 | Srivastava et al. | |
| 2017/0264606 A1 | 9/2017 | Forssell et al. | |
| 2017/0289820 A1 | 10/2017 | Hong et al. | |

OTHER PUBLICATIONS

U.S. Appl. No. 62/007,388 [RAN2] System Operation and Enhanced Radio Resource Control (RRC) Rotocol for Integrated WLAN/3GP Radio Access Technologies.
Communication Under Rule 71(3) EPC of Intention to Grant dated Nov. 8, 2018 for European Patent Application No. 15184273.9.
William Pearson, Find the iPhone MAC Address, OSXDaily, Aug. 5, 2010.
Christina-Elena Vintila, Victor-Valeriu Patriciu, Ion Bica, "Security Analysis of LTE Access Network", ICN 2011—The Tenth International Conference on Networks, 2011.
Office Action dated Jul. 13, 2017 issued for U.S. Appl. No. 14/480,058.
Gast, Matthew; "802.11 Wireless Networks: The Definitive Guide, 2nd Edition," O'Reilly Media Inc.; 2005; pp. 30 and 161.
RP-11094; Discussions on Carrier Aggregation Across LTE and WIFI; Intel Corporation; 3GPP TSG-RAN Meeting #53 Fukuoka, Japan, Sep. 13-16, 2011; 4 pages.
IEEE Std. 802.11—2012; Part 11: Wireless LAN Medium Access Control (MAC) and Physical Layer (PHY) Specifications; The Institute of Electrical and Electronics Engineers, Inc; Mar. 29, 2019; 2793 pages.
3GPP TS 23.401 v12.1.0; "General Packet Radio Service (GPRS) Enhancements for Evolved Universal Terrestrial Radio Access Network (E-UTRAN) Access (Release 12);" 3GPP Organizational Partners; Jun. 2013; 291 pages. 2013.
3GPP TS 36.300 v11.7.0; "Evolved Universal Terrestrial Radio Access (E-UTRA) and Evolved Universal Terrestrial Radio Access Network (E-UTRAN); Overall Description; Stage 2 (Release 11); "3GPP Organizational Partners; Sep. 2013; 209 pages. 2013.
3GPP TS 33.401 v12.10.0; "3GPP System Architecture Evoluation (SAE): Security Architecture (Release 12)," 3GPP Organizational Partners; Dec. 2013; 121 pages.
NTT Docomo's Views on LTE Unclisensed, NTT Docomo, Inc. Workshop on LTE in Uncliensed Bands, Paris, France, Jan. 21-22, 2014; 13 pages.
Extending the benefits of LTE to unlicensed spectrum, Qualcomm, Workshop on LTE in Unlicensed Bands, Paris, France, Jan. 21-22, 2014; 34 pages.
3GPP RAN#64; RP-140738, "Study Item Proposal on E-UTRAN and WLAN Aggregation," Qualcomm; Sophia Antipolis, France, Jun. 10-13, 2014; 5 pages.
3GPP RAN#64; RP-140739, "Motiviation for LTE-WiFi Aggregation," Qualcomm, Sophia Antipolis, France, Jun. 10-14, 2014, 8 pages.
Office Action dated Nov. 2, 2018 issued for U.S. Appl. No. 14/480,058.
Extended European Search Report issued for European Patent Application No. 19170711.6 dated Aug. 28, 2019.
Recommendations for Minimal Wi-Fi Capabilities of Terminals Version 1.0 Jun. 7, 2012, pp. 1-37; GSM Associate Official Document TS 22.
Ruckus: How Interworking Works: A Detailed Look at 802.11u and Hotspot 2.0 Mechanisms, pp. 1-12, Jul. 2013.
Non-Final Office Action action dated Apr. 4, 2019 issued for U.S. Appl. No. 14/480,058.
3GPP TS 36.304 V12.2.0; 3rd Generation Partnership Project; Technical Specification Group Radio Access Network; Evolved Universal Terresrial Radio Access (E-UTRA); User Equipment (UE) Procedures in Idle Mode; Release Sep. 12, 2014; 37 pages.
3GPP TS 36.321 V11.4.0; 3rd Generation Partnership Project; Technical Specification Group Radio Access Network; Evolved Universal Terrestrial Radio Access (E-UTRA); Medium Access Control (MAC) Protocol Specification; Release 11; Dec. 2013; 57 pages.
3GPP TS 36.331 V12.3.0; 3rd Generation Partnership Project; Technical Specification Group Radio Access Network; Evolved Universal Terrestrial Radio Access (E-UTRA); Radio Resource Control (RRC); Protocol Specification; Release 12; Sep. 2014; 378 pages.
Rao, V. Srinivasa, et al.; "Protocol Signaling Procedures in LTE"; Sep. 2011; 11 pages.
Office Action dated Sep. 26, 2016; U.S. Appl. No. 14/479,985, filed Sep. 8, 2014; 18 pages.
Final Office Action dated May 9, 2017; U.S. Appl. No. 14/479,985, filed Sep. 8, 2014; 20 pages.
Advisory Action dated Aug. 7, 2017; U.S. Appl. No. 14/479,985, filed Sep. 8, 2014; 12 pages.
Office Action dated Dec. 11, 2017; U.S. Appl. No. 14/479,985, filed Sep. 8, 2014; 21 pages.
Final Office Action dated Jul. 6, 2018; U.S. Appl. No. 14/479,985, filed Sep. 8, 2014; 28 pages.
Advisory Action dated Sep. 26, 2018; U.S. Appl. No. 14/479,985, filed Sep. 8, 2014; 4 pages.
Notice of Allowance dated Dec. 5, 2018; U.S. Appl. No. 14/479,985, filed Sep. 8, 2014; 11 pages.
Office Action dated Oct. 27, 2015; U.S. Appl. No. 14/480,058, filed Sep. 8, 2014; 19 pages.
Final Office Action dated May 19, 2016; U.S. Appl. No. 14/480,058, filed Sep. 8, 2014; 15 pages.
Advisory Action dated Aug. 11, 2016; U.S. Appl. No. 14/480,058, filed Sep. 8, 2014; 6 pages.
Office Action dated Nov. 8, 2016; U.S. Appl. No. 14/480,058, filed Sep. 8, 2014; 15 pages.
Advisory Action dated Oct. 19, 2017; U.S. Appl. No. 14/480,058, filed Sep. 8, 2014; 10 pages.
Office Action dated Mar. 9, 2018; U.S. Appl. No. 14/480,058, filed Sep. 8, 2014; 21 pages.
Notice of Allowance dated Oct. 2, 2019; U.S. Appl. No. 14/480,058, filed Sep. 8, 2014; 11 pages.
Canadian Office Action; Application No. 2,903,169; dated Nov. 10, 2020; 4 pages.
European Extended Search Report; Application No. 15184273.9; dated Jan. 29, 2016; 6 pages.

* cited by examiner

METHOD AND APPARATUS FOR SIMULTANEOUS USE OF BOTH LICENSED AND UNLICENSED WIRELESS SPECTRUM

FIELD OF TECHNOLOGY

The present disclosure relates to wireless portable electronic devices, including but not limited to portable electronic devices that can operate compatibly using either licensed or unlicensed wireless spectrum.

BACKGROUND

Wireless portable electronic devices (also referred to herein as portable electronic devices) are well known and nearly ubiquitous in modern life. In addition to often supporting a wide variety of local and/or native functionality these devices also often transceive various kinds of data via one or more wireless links. Examples of wireless links include but are not limited to Long Term Evolution (LTE)-based radio networks that employ licensed wireless spectrum and 802.11-compatible wireless local area networks (WLAN's) that employ unlicensed wireless spectrum. (As used herein, the expressions "licensed" and "unlicensed" shall be understood to refer to license-based authorization and control as implemented and governed by a given national government(s) within its territory or region via a corresponding agency such as, in the United States, the Federal Communications Commission.)

Some functionality can require substantial use of a given device's wireless communications capabilities. Such substantial use, in turn, can require sending and/or receiving large quantities of data. Unfortunately, many licensed wireless spectrum-based networks charge accordingly and/or limit the amount of data that can be transceived via their networks. It is known in the art to rely instead upon an available network that employs unlicensed wireless spectrum when transceiving large quantities of data to avoid such restrictions/costs. Unfortunately, merely providing such a capability in a portable electronic device as an available option does not necessarily meet all user requirements and/or the needs of all application settings.

For example, to date, integration of unlicensed spectrum into an operator's core network has been done mainly at higher layers providing mainly IP-level interworking between licensed and unlicensed spectrum. Such an approach leads to a number of corresponding problems. Peak throughput per application, for example, is often not improved as a given bearer/APN traffic is still routed via a single access network. Such an approach can also negatively impact the core network nodes in the operator's network, and the network operator may also be required to run a separate Operations Support System (OSS) for the WLAN network and the cellular network and separate authentication mechanisms/infrastructure.

As a more specific example in these regards, LTE and 802.11 operate with different paradigms for traffic scheduling. LTE works on the basis of (synchronous) scheduled transmissions over the air while 802.11 works on the basis of opportunistic (asynchronous) transmission based on channel availability. There is no mechanism to merge these two paradigms and to thereby integrate the 802.11 and LTE access networks at a low level to enable bearer split across these access networks to enable peak throughput improvements per application.

As another example in these regards, there are no particular effective and efficient communicative protocols by which one can readily establish simultaneous use of both licensed and unlicensed wireless spectrum.

DETAILED DESCRIPTION

Figure 1:
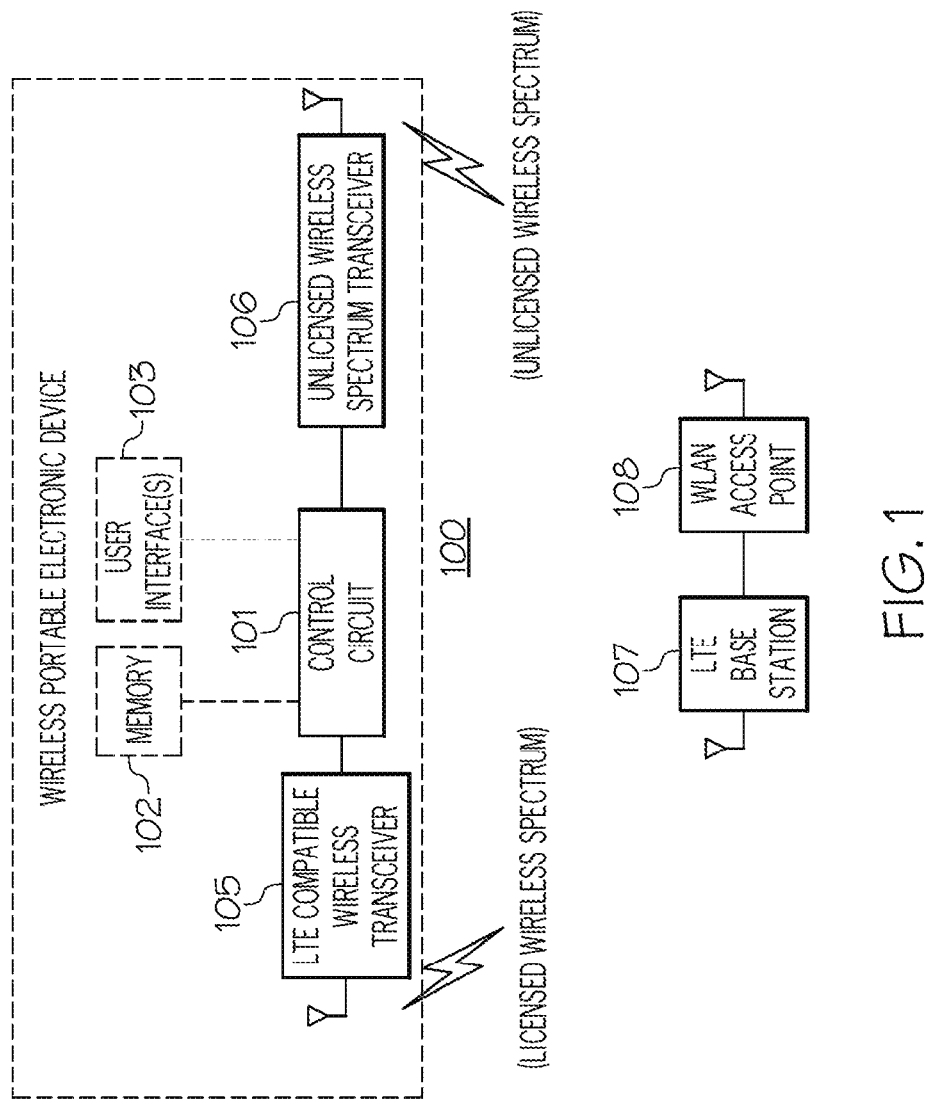
FIG. 1 is a block diagram in accordance with the disclosure.

The following describes an apparatus and method pertaining to achieving a tighter integration between 802.11 and LTE below the PDCP or the RLC layer of LTE. This integration includes configuring a control circuit to determine that a wireless portable electronic device currently being serviced via licensed wireless spectrum should also be served via unlicensed wireless spectrum and then transmitting a Radio Resource Control (RRC) message to cause the wireless portable electronic device to connect to a network node operating in the unlicensed wireless spectrum. By one approach this control circuit comprises an Evolved Node-B base station in a Long Term Evolution (LTE) Radio Access Network (RAN) and the network node operating in the unlicensed wireless spectrum comprises an 802.11-compatible wireless local area network node.

So configured, both licensed and unlicensed wireless spectrum can be simultaneously leveraged to support the data transmission/reception requirements of a portable electronic device. These teachings are relatively simple to embody and yet efficient, effective, and reliable in practice.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The various examples provided here in presume implementation via a corresponding wireless portable electronic device, a network node or entity that employs licensed wireless spectrum, and/or an access point that employs unlicensed wireless spectrum. Without intending any reticular limitations in these regards, FIG. 1 presents some examples in these regards.

In this example the wireless portable electronic device 100 includes a control circuit 101 that operably couples to a memory 102 and one or more user interfaces 103. Such a control circuit 101 can comprise a fixed-purpose hard-wired platform or can comprise a partially or wholly programmable platform. These architectural options are well known and understood in the art and require no further description here. This control circuit 101 is configured (for example, by using corresponding programming as will be well understood by those skilled in the art) to carry out one or more of the steps, actions, and/or functions described herein.

The memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

This memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

In this illustrative example the control circuit 101 also operably couples to a first transceiver comprising a Long Term Evolution (LTE)-compatible wireless transceiver 105 that employs licensed wireless spectrum. The control circuit 101 also operably couples to a second transceiver comprising an unlicensed wireless spectrum transceiver 106 such as an 802.11-compatible transceiver. Such transceivers are very well known in the art and therefore, for the sake of brevity, further elaboration will not be provided here.

So configured, the wireless portable electronic device 100 can communicate via the LTE-compatible wireless transceiver 105 with a corresponding LTE base station 107 (such as an Evolved Node-B base station in an LTE Radio Access Network (RAN). The wireless portable electronic device 100 can also communicate, via the unlicensed wireless spectrum transceiver 106, with a corresponding WLAN access point 108 such as a Wi-Fi access point. In this illustrative example the aforementioned LTE base station 107 communicatively couples to the WLAN access point 108. This communicative coupling can comprise a wireless and/or a wired coupling as desired.

Figure 2:
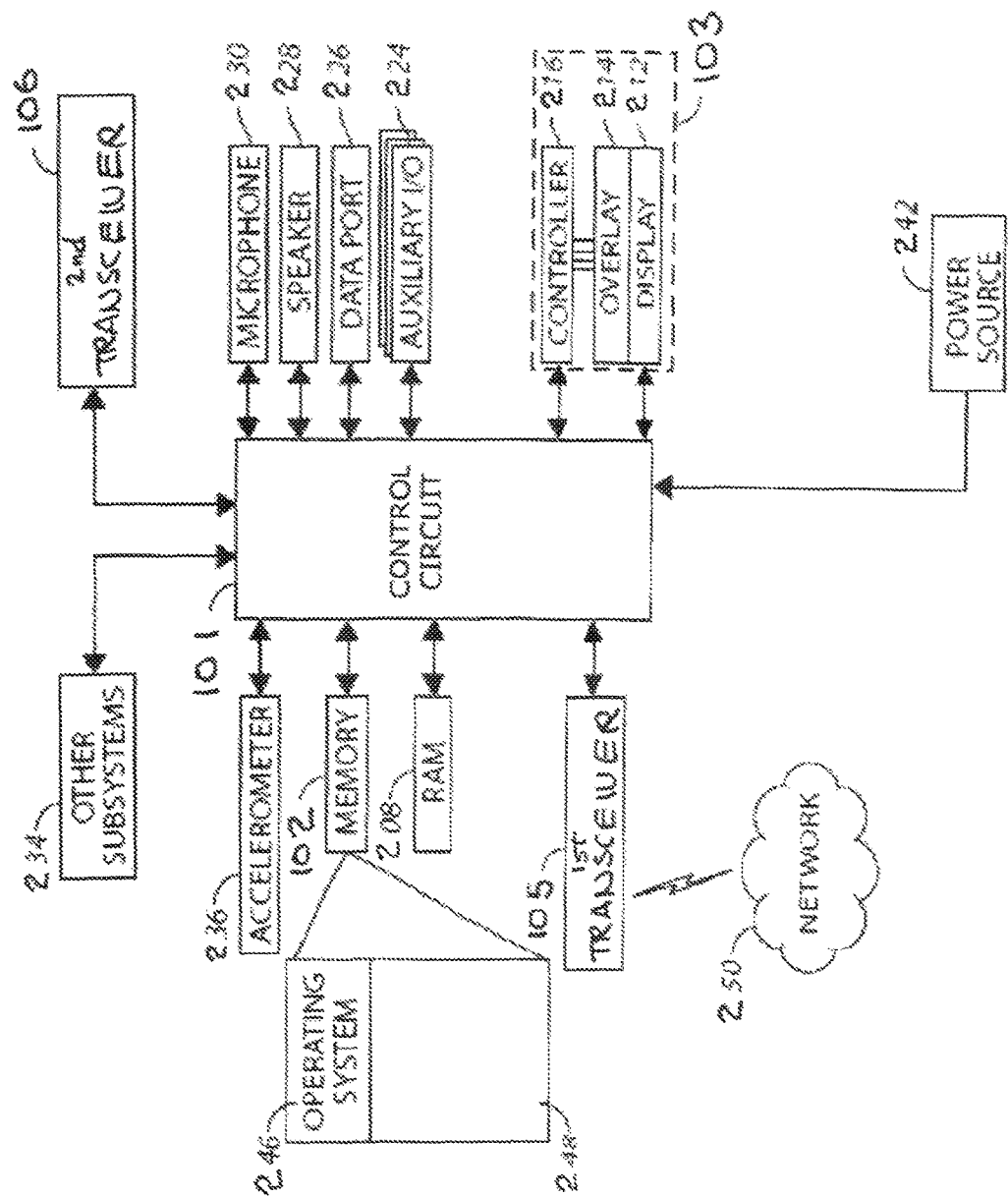
FIG. 2 is a block diagram in accordance with the disclosure.

As a further illustrative example in these regards, but again without intending any particular limitations by way of the specificity of this example, FIG. 2 presents an exemplary portable electronic device 100 that includes the aforementioned control circuit 101 that controls the overall operation of the portable electronic device 100. The portable electronic device also includes an operating system 246 and software programs, applications, or components 248 that are executed by the control circuit 101 and that are typically stored in the aforementioned memory 102.

At least some wireless communication functions, including data and voice communications, are performed through the aforementioned first transceiver 105 and second transceiver 106. The first transceiver 105 communicates via a corresponding network 250 (and in particular via the aforementioned LTE base station 107) while the second transceiver 106 communicates via the aforementioned WLAN access point 108 (not shown in FIG. 2).

A power source 242, such as one or more rechargeable batteries or a port to an external power supply, powers the device. The control circuit 101 may interact with an accelerometer 236 that may be utilized to detect direction of gravitational forces or gravity-induced reaction forces. The control circuit 101 also interacts with a variety of other components, such as a Random Access Memory (RAM) 208, an auxiliary input/output (I/O) subsystem 224, a data port 226, a speaker 228, a microphone 230, and other device subsystems 234 of choice.

The aforementioned user interface 103 can include a display 212 that is disposed in conjunction with a touch-sensitive overlay 214 that operably couples to an electronic controller 216. Together these components can comprise a touch-sensitive display that serves as a graphical-user interface. Information, such as text, characters, symbols, images, icons, and other items may be displayed on the touch-sensitive display via the control circuit 101.

For the sake of an illustrative example the following description will presume that the aforementioned network 250 comprises an LTE RAN (Radio Access Network) that consists of eNBs to provide the LTE user plane (PDCP/RLC/MAC/PHY) and control plane (RRC) protocol terminations towards the UE. The eNBs are interconnected with each other by means of an X2 interface. The eNBs are also connected by means of an S1 interface to the EPC (Evolved Packet Core), more specifically to an MME (Mobility Management Entity) by means of an S1-MME interface and to a Serving Gateway (S-GW) by means of an S1-U interface. The S1 interface supports a many-to-many relation between MMEs/Serving Gateways and eNBs.

PDCP, RLC, and MAC sublayers (terminated in eNB on the network side) perform functions including header compression (PDCP), ciphering (PDCP), scheduling (MAC), ARQ (RLC), and HARQ (MAC) for the user plane (UP). The RRC protocol mainly controls the mobility procedures and system broadcast messages and so forth.

In LTE, transmission on the medium happens under control of the MAC protocol layer via scheduling. Downlink packets are buffered in the eNB and a scheduler in the eNB's MAC layer determines when packets will be transmitted to a given UE. In the uplink each UE has to request resources for the uplink transmission and an uplink scheduler within the eNB's MAC layer decides which UE will be allowed access to the uplink channel resources in any given Transmission Time Interval (TTI).

The MAC layer interfaces with the RLC layer above by grabbing a given amount of data from the RLC layer at each transmission opportunity. The amount of data obtained by the MAC layer from the RLC layer depends on the amount of data that can be accommodated on a given TTI. This amount of data (or the data size) indicated by MAC to the higher layers at each TTI is referred to as the grant size. This grant size is explicitly communicated by the eNB to the UE for both downlink and uplink grants via the downlink PDCCH channel. Thus, conveying the grant size to upper layers is one of the services provided by MAC to RLC for both uplink and downlink in case of LTE.

Since the eNB is responsible for providing the grants for uplink data transmissions, the eNB needs to have an idea of how much pending data there is in the UE's uplink buffer. Accordingly, when the data in the UE's uplink buffer changes (for example, when new data arrives in the PDCP layer), the UE generates a buffer status report (BSR) to inform the eNB of the pending uplink data in the UE's buffer upon certain trigger conditions (see, for example, 3GPP TS 36.321). If no uplink resources are available to the UE to send the BSR, the UE must first send an initial short "scheduling request" indication to the eNB and await the subsequent grant of uplink resources on which to send the BSR information. Having received the BSR, the eNB then takes the UE's buffer status into account in its scheduling decisions and subsequent uplink grants.

Once the MAC obtains a given chunk of data from the RLC layer, the MAC packages the data into a MAC PDU and submits to the lower layers (in this case, the physical layer) for transmission. A single MAC PDU forms one transport block (one transport block is transmitted per TTI, i.e. per 1 ms). The MAC PDU may carry multiple MAC SDUs (i.e. multiple RLC PDUs). In this way the MAC layer can potentially multiplex traffic from multiple RLC logical channels into one MAC PDU.

There is a MAC sub-header associated with each MAC SDU. These sub-headers are used to inform the receiving MAC entity as to how many SDUs there are and with which logical channels those SDUs are associated. A transport format is associated with each transport block that informs the receiving entity of the MCS scheme that has been used in the PHY transmission of the transport block.

The MAC layer may add padding bits to the MAC PDU so that it fits in the TTI (in the case where the grant size is greater than the available size of the MAC PDU). The LTE MAC always informs the higher layers about each transmission opportunity (grant) for a given TTI. Hence, LTE MAC operation can be seen as being synchronous (in particular, they occur at 1 ms intervals—which is also the TTI in case of LTE). In other words, every 1 ms, when there is a transmission opportunity, the LTE MAC informs the higher layers of this opportunity.

The MAC also provides a mechanism to retransmit a MAC PDU. That is, once the MAC PDU is submitted to the lower layers, the MAC layer provides a Hybrid Automatic Repeat Request (HARM) service to ensure delivery of data between the peer MAC entities.

The RLC layer in LTE is mainly responsible for segmentation and concatenation of the higher layer (PDCP) data packets. RLC plays the important role of feeding the lower layer (MAC) with just enough data that can be transmitted using a given transmission opportunity (i.e., a scheduled TTI). The amount of data that can be sent via a given transmission opportunity is variable and is a function of current radio conditions and scheduling decisions amongst other things.

The RLC layer operates in 3 modes as follows. In an RLC transparent mode (TM), no segmentation or concatenation of upper layer (PDCP) data is possible, an RLC header is not appended to the data, and higher layer data is passed transparently (unaltered) to the MAC. RLC TM is typically used where the size of the data whose scheduling instances and scheduled size is known a priori (hence obviating the need for segmentation or concatenation). A typical example of RLC TM data is broadcast control channel (BCCH) data that is periodically repeated in downlink at predetermined time intervals.

In an RLC Unacknowledged Mode (UM), segmentation or concatenation is possible and RLC SDU (PDCP data) is segmented and/or concatenated to create one or more RLC PDUs that are passed down to the MAC. The segmentation or concatenation is performed based on the grant size indicated by the MAC layer. An RLC header is appended and there is no acknowledgement of the received RLC data from the peer entity. RLC UM is typically used for applications that are delay sensitive and error tolerant. The lower layers (i.e., the MAC layer and physical layer) below the RLC layer combine to provide an ultimately unreliable channel. Hence, without RLC acknowledgements, there may be residual errors in the transmitted data packets. Some applications (like voice and interactive video) are tolerant to residual errors in the received bit stream but are delay sensitive. RLC UM is typically used for such applications.

In an RLC Acknowledged Mode (AM), segmentation and/or concatenation is again possible and hence the initial aspects of the RLC Unacknowledged Mode are utilized here. After then appending an RLC header the transmitter entity buffers the transmitted RLC PDUs and awaits an ACK/NACK from the receiver RLC entity. Upon receiving a NACK, the RLC PDU is retransmitted (after further segmentation if necessary depending on the grant size for retransmission instance). RLC AM is used for applications that essentially rely on reliable delivery (as a further complement to HARQ at the MAC layer which already provides some robustness against transmission errors). Applications such as HTTP, file download, and so forth would typically use an RLC AM radio bearer.

In LTE the UE may be either in RRC_CONNECTED (connected) mode or in RRC_IDLE (idle) mode. The mechanisms used to control UE mobility between cells of the network differs between the idle and connected modes. In idle mode, mobility is controlled by the UE. In particular, the UE performs cell selection and reselection procedures as per 3GPP Technical Specification 36.304 and in accordance with related configuration parameters set by the network. Following selection or reselection of a new cell by the UE, the UE will inform the network of its new location only if the new cell belongs to a tracking area that is different from the tracking area of the previous camped cell (a tracking area is a group of cells—which cells belong to which tracking area is dependent upon network configuration). Thus, in idle mode, mobility reports are only seldom sent by the UE, and the network is aware of the UE's location with relatively coarse granularity (tracking area level as opposed to cell level).

In connected mode, the UE performs measurements of other cells (on the same or other frequencies) according to the configuration sent to the UE by the network in measurement control messages. The measurements are reported by the UE to the network wherein they are used by the network to make handover decisions. Subsequent to a handover decision by the network, the UE is instructed to move to another cell or frequency. Thus, in connected mode, measurement reports may be sent relatively frequently and the network is aware of the UE's location with finer granularity (to the cell level).

Aspects of particular note in the foregoing regards include the UE being is requested to make measurements on other eNB s, the UE providing the eNB with its measurements, and the eNB making the decision as to whether or not the device will handover to the new eNB. At inter eNB handover of the Primary Cell (PCell) the eNB can use RRC signalling to add/remove or reconfigure Secondary Cells (SCells). SCells are deactivated at handover.

Carrier aggregation (CA) is a feature that enables two or more LTE carriers (called component carriers—CCs) to be simultaneously used to send data to/from the same UE. LTE allows carrier aggregation for up to 5 CCs at the same time. Accordingly a UE may be configured with one PCell and one or more SCells. LTE provides a MAC layer mechanism for activating/deactivating an SCell that is used in carrier aggregation. MAC layer Control Elements can be transmitted by an eNB to activate or deactivate SCells that have been previously configured in a UE via RRC signalling. The MAC control elements contain a bitmap for all configured SCells to indicate which are activated or deactivated.

Figure 15:
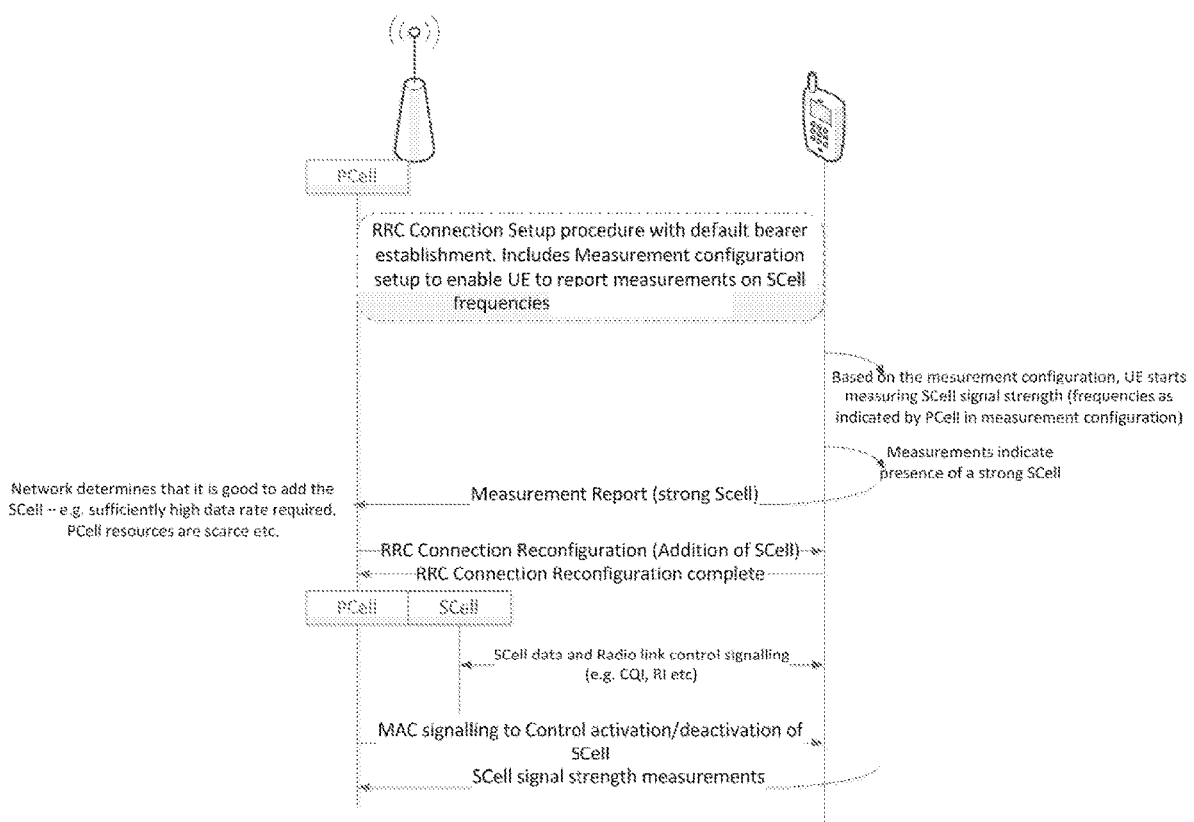
FIG. 15 is a call flow diagram in accordance with the prior art.

The eNB can configure the device to make measurements on SCells and to produce measurement reports when certain criteria are satisfied. Examples in these regards include when an SCell signal becomes worse than a signal threshold or when an SCell signal becomes greater than a threshold. The eNB can then add or remove SCells using the RRCconnectionreconfiguration message. FIG. 15 presents an illustrative connection set-up procedure 1500 in these particular regards.

An LTE UE establishes Internet Protocol (IP) connectivity with the Evolved Packet Core (EPC) using the ATTACH procedure. Accordingly the device has to have performed a PLMN selection and a cell selection for the purposes of deciding which eNB to send the Attach Request and a Non-Access Stratum (NAS) Security Mode Command procedure is used to establish a NAS security association between the UE and the Mobility Management Entity (MME) in the EPC (encryption/integrity protection) to protect NAS signalling. In addition the access stratum Security Mode Command procedure is used to enable ciphering of user plane traffic and both ciphering and integrity protection of control plane RRC traffic. Also, the P-GW assigns an IP address for a default bearer and this is notified to the UE.

In LTE, PDCP provides ciphering/deciphering (between the UE and the eNB) for both the user plane and the RRC control plane, while providing integrity protection and verification for the LTE RRC control plane only. LTE specifies a hierarchy of keys to support this approach. One particularly important key is the KUPenc key which is the key that provides for user plane ciphering. This particular key is derived via KeNB, which is derived via KASME, which is derived via the CK and IK, which are derived from the subscriber specific Master key K. In deriving a new KeNB key during handover, input parameters corresponding to the physical cell ID, Nex Hop (NH), and downlink frequency (EARFCN-DL) are used.

One commonly implemented method of accessing the channel implemented in IEEE 802.11 MAC is termed the Distributed Coordination Function (DCF) which is a CSMA/CA method. The concept of Inter Frame Spacing (IFS) is key to the method by which stations access the channel in 802.11. Once a previous transmission on the channel has completed, a station will wait for at least an interframe spacing period before starting or resuming its own backoff timer.

There are multiple IFS defined, which enables priority handling to be achieved in accessing the channel. SIFS (Short IFS) is the shortest IFS and is used by higher priority transmissions such as CTS/ACK transmissions. These transmissions can occur immediately after the SIFS has elapsed. Stations can access the channel on a contention basis after the DCF-IFS (DIFS) has expired. SIFS is of the order of 10 µs and DIFS is of the order of 50 µs (values vary between 802.11 physical layers).

As regards contending for channel access, stations monitor the channel for the channel to go quiet. The device waits for the aforementioned DIFS period and it is then necessary for the channel to remain quiet for an additional Backoff period before the station can access the channel. Backoff is a randomly-drawn time delay parameter. In order to ensure that the device is eventually able to access the channel the Backoff period is decremented after every interval that the channel is quiet for a period DIFS. The duration of the Backoff timer is randomly determined based on the CWindow (contention window). The CW increases after an unsuccessful transmission and reverts to CWmin after a successful transmission.

802.11 also defines a Point Coordination Function (PCF) that is used in an access point within an infrastructure BSS. The point coordinator determines which station currently has the right to transmit so that contention is avoided in this mode. (That said, this mode of operation has not been widely implemented/deployed in practice.)

Generally speaking, 802.11 MAC is based on opportunistic transmission of data on the physical layer (i.e., transmitting when the medium is free). Once the MAC gains access to the medium, it transmits until the MAC PDU is completely transmitted. Once transmission of MAC PDU is complete, the 802.11 MAC grabs another chunk of data (usually an IP packet) from the upper layers and awaits another transmission opportunity. Thus, the 802.11 MAC can be viewed as operating in an asynchronous mode—i.e. accessing and grabbing data from the higher layers whenever the transmission (and acknowledgement) of a previous packet concludes. Such an approach contrasts with LTE practice where the LTE MAC operates on 1 ms time boundaries.

Generally speaking, mobility in case of 802.11 is UE controlled. The UE measures the signal strength of available 802.11 access points and selects the most suitable one according to implementation-specific criteria and associates with the selected access point for communication. If the UE moves and hence in the process loses connection to its associated 802.11 access point, it reinitiates a search for available 802.11 access points and again selects the best available access point. The UE may perform this UE-based mobility procedure without regard to whether or not the UE is also then actively engaged in user data transfer.

Figure 16:
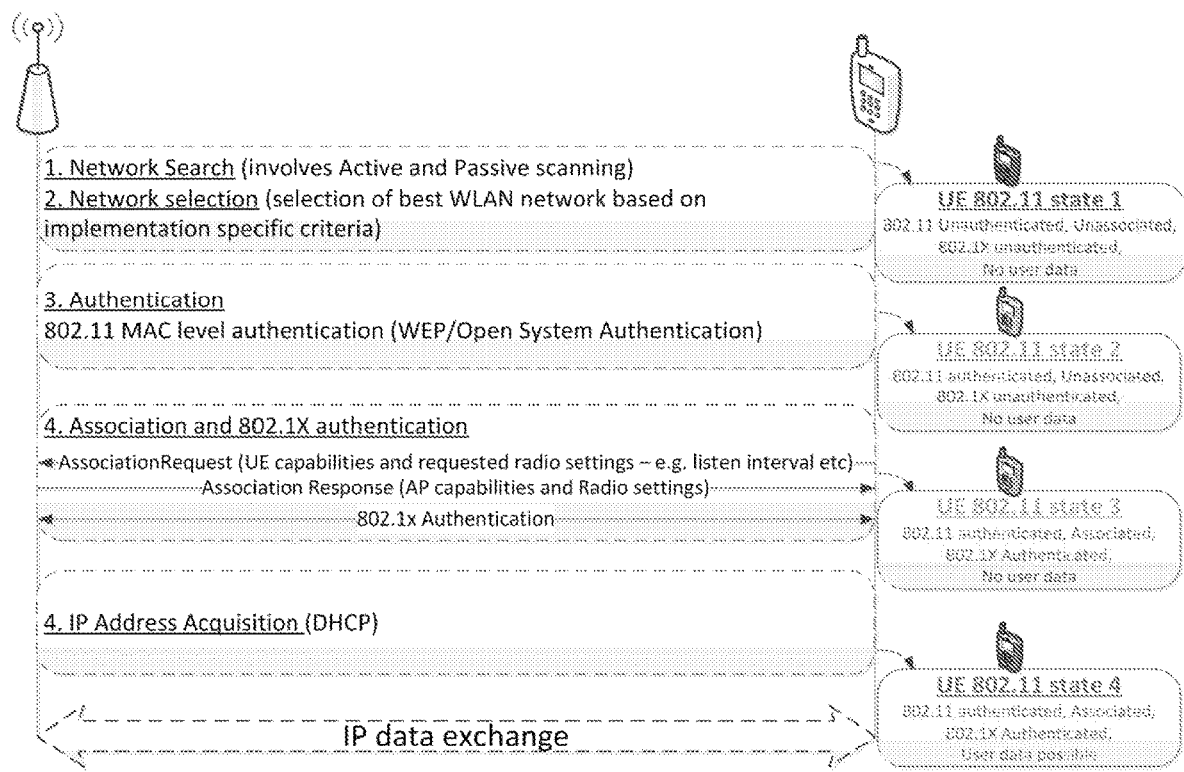
FIG. 16 is a call flow diagram in accordance with the prior art.

Referring generally to FIG. 16, the process 1600 of obtaining connectivity over a conventional 802.11-based WLAN involves a number of steps that are undertaken as follows. First, scanning determines which WLANs are within range. There are two main approaches in these regards. With passive scanning the device tunes to different radio channels and listens for 802.11 Beacon frames. By default, beacon frames are typically transmitted every 100 msec. With active scanning, when the device needs to make a selection quickly (and does not wish to wait for the periodic beacon transmission) the UE can issue a Probe Request message. Access Points that receive the Probe request message will respond with a Probe Response. Once the device knows which WLANs are within coverage and their characteristics (e.g. signal strength, the type of credentials the WLAN will accept) it can choose a WLAN.

802.11 supports two types of authentication. With Open System Authentication any device may connect to the network without requiring an exchange of credentials. A two-step message exchange between the device and the access point completes the authentication. With Shared Key Authentication (WEP), manually-configured keys in the access point and the device are used as part of a four-step message exchange between the device and the access point. (This mechanism is now largely discredited.)

After successful MAC layer authentication the device needs to associate with the access point. Association serves a number of purposes. An access point may form part of an Extended Service Set (ESS). Access points's within an ESS are connected to one another (typically via a wired connection). The association process enables the device to indicate the particular access point within the ESS with which it wishes to communicate. This then enables the access point to notify the distribution system frame router so that downlink packets are sent to the appropriate access point for downlink transmission. Association also facilitates the sharing of the capabilities (such as PHY layer capabilities) of the device and access point.

Given the problems with open system authentication and shared key WEP authentication, it is expected that a carrier WLAN deployment might make use of 802.1X (EAPoL) authentication mechanisms. Such mechanisms are used as part of WPA and WPA2 (Wi-Fi Protected Access). 802.1X, in combination with a suitable EAP method (e.g. EAP-SIM), allows the device to authenticate using its cellular SIM credentials (amongst other e.g. certificate based solutions).

Where 802.1X is used the access point performs port blocking until after the authentication process is complete. In other words the access point allows the device to send EAP frames that are passed to the authentication server but the device is prevented from sending other types of traffic. The procedure also delivers keys that are used for 802.11 MAC layer encryption.

Once authenticated the device can acquire an IP address using DHCP. The device can then send and receive IP packets via corresponding user plane IP connectivity.

802.11 provides a number of mechanisms for encrypting and integrity-protecting traffic, these include WEP, TKIP and CCMP. WEP is increasingly distrusted] and TKIP is being phased out in the market. TKIP was used in WPA and the AES-based CCMP is used as part of WPA2. CCMP is considered by many to be the most robust approach. More recently, 802.11 provides a Protected Management Frames feature (IEEE 802.11w—2009) that provides for encryption and integrity protection of WLAN management frames. This feature makes use of existing mechanisms, e.g. CCMP.

IEEE 802.1AC is an architecture document that describes a MAC interface. Historically all the IEEE 802 groups (802.3, 802.5, 802.11, 802.17, 802.20) have developed slightly different definitions of their MAC interface for various reasons. In IEEE 802.1AC a network-agnostic definition of a MAC is described. The MAC SAP (service access point) defined in IEEE 802.1AC provides a standard set of services to the layer above (MAC Service user).

IEEE 802.11ak is an ongoing effort in 802.11 to bring the 802.11 standard in line with the IEEE 802.1AC definition of the common MAC SAP. This provides a defined interface on the STA and AP for MAC frames to be transported transparently across an 802.11 network.

In order to enable operators of 3GPP systems to use unlicensed spectrum, 3GPP has defined mechanisms for LTE and 802.11 interworking. These mechanisms enable a device to connect to the EPC using either LTE or WLAN access technologies. In recent enhancements to this interworking approach (as part of 3GPP Release-12), choice-of-access technology is based on additional radio-level information (such as signal strength, quality, and system load) and is governed either by rules provided to the UE via the RAN (RAN rules) or by rules provided to the UE via the EPC in ANDSF policies.

There are a range of different methods provided in 3GPP release 12 (and previous releases) by which 3GPP operators can provide connectivity over a WLAN into the 3GPP operator's CN. All these methods are distinguished by the fact that the mobility anchor point is the P-GW in the EPC core network. In this way handover between the WLAN and cellular-based service is supported while maintaining the UE's IP address (IP session continuity). The network can use either network-based IP mobility or host-based IP mobility to manage UE mobility. In the former case the device is assigned an IP address and the network ensures that packets destined for the user reach the user as the device moves around (e.g. by re-routing GTP tunnels). In host-based IP mobility the device receives a new IP address when it changes to a new WLAN and needs to notify the 3GPP CN P-GW (home agent) of the new IP address so that packets destined for the user can be appropriately re-routed to the new IP address.

Figure 3:
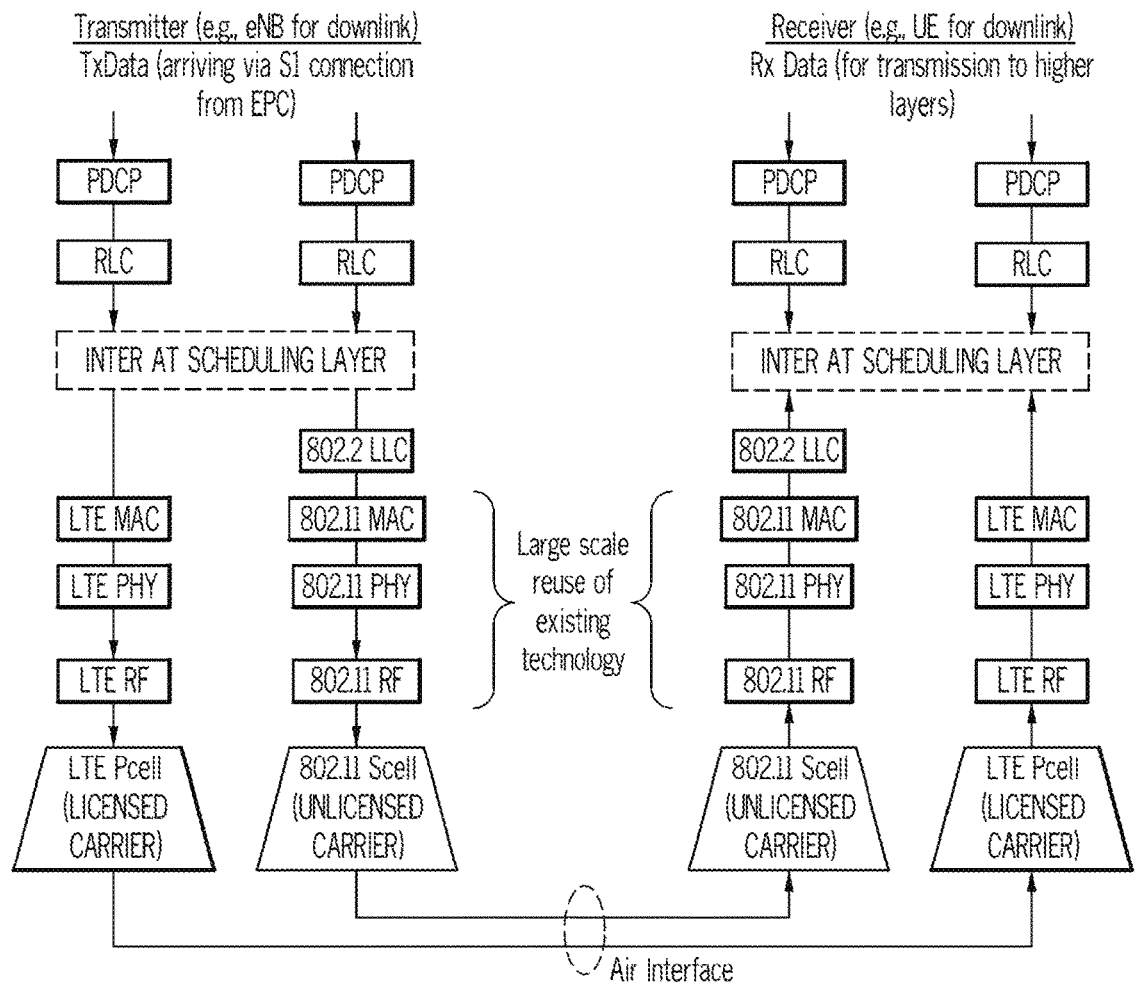
FIG. 3 is an architectural representation in accordance with the disclosure.

The present teachings present various approaches to achieving a tighter integration between 802.11 and LTE below the PDCP or the RLC layer of LTE. This model of interworking between LTE and 802.11 is sometimes referred to herein as Tight Coupled Inter-Working (TCIW). FIG. 3 presents a general protocol architecture 300 in these regards. (Note that the 802.2 LLC layer may or may not be present; also note that the portable electronic device 100 may sometimes be referred to herein as User Equipment (UE) in keeping with industry parlance.)

Unlike LTE-U the present teachings propose re-using existing mechanisms in 802.11 MAC and Phy. The TCIW mode of operation is only exposed to the eNB (as the protocol stacks are merged below PDCP layer—i.e., the protocol stack in the eNB), it is hence transparent to the Non-Access Stratum. Thus, the MME or SGW in the EPC are unaware of the TCIW operation. This also means that no new core network nodes are necessary to support the TCIW operation.

By one approach the 802.11 SCell shown in FIG. 3 may belong to one of the access points of an ESS controlled by the eNB when link layer mobility of 802.11 can be used for the UE to seamlessly (i.e., without involving the eNB) move between the access points belonging to the same ESS—in this scenario, the ESS is identified by a HESSID.

In the more likely case of the SCell being a single access point under the control of the eNB, the HESSID and the BSSID of the 802.11 SCell essentially identify the same SCell node. The SCell is generally described herein as being identified by its BSSID. This also means that an unlicensed carrier is used as an aggregated carrier along with the licensed carrier which is the LTE PCell (i.e. CA mode of operation of LTE). In the general case however, the concepts described herein may also be extended to a WLAN architecture where multiple access points are controlled by the eNB and these access points form an ESS identified by a HESSID (instead of BSSID).

By one approach the 802.11 access point is logically integrated into the eNB. Accordingly, the Destination Address (DA) that indicates the final destination of the MAC frames on the 802.11 air interface can be set to anything indicating that the MAC data frames sent on 802.11 need to be routed to the eNB (this could be, for example, the MAC address of the eNB or even the PGW/SGW address in the operator core network). Upon reaching the eNB's RLC entity they are reassembled and passed on to the upper layers. Similarly, in downlink, the received MAC frames on the 802.11 air interface are also routed to the receiving RLC entity on the UE side for further processing.

Figure 4:
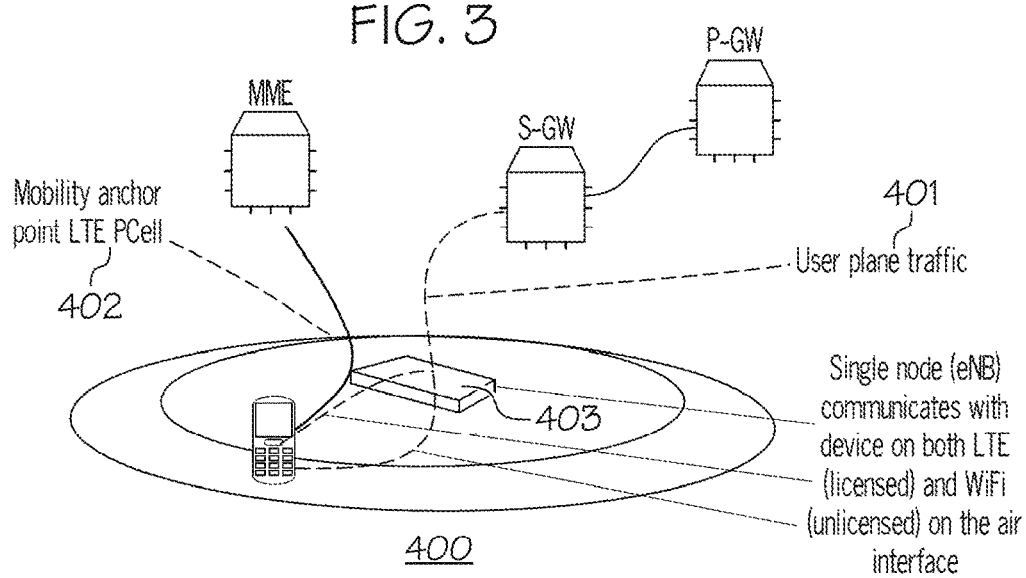
FIG. 4 is an architectural representation in accordance with the disclosure.

FIG. 4 presents one illustrative example of network architecture 400 for deploying the TCIW solutions disclosed herein. In particular, the present teachings propose using an 802.11 based channel operating in unlicensed spectrum as a secondary cell/carrier (SCell over the air interface) which is terminated in an LTE eNB. Following the existing LTE carrier aggregation terminology, the air interface between the eNB and the UE over the licensed carrier (i.e., LTE) is referred to as the LTE PCell and the air interface between the eNB and the UE over an unlicensed carrier (i.e., 802.11) is referred to as the 802.11 SCell.

As well exemplified in FIG. 4 the user plane traffic 401 can be split between the LTE PCell 402 and the 802.11 SCell 403 whilst the LTE PCell 402 acts as a mobility anchor (such that the core network knows the UE location based on the connection to the LTE PCell). This architecture minimizes negative impacts to the 802.11 side and maximizes the reuse of the protocol messages (especially the RRC messages) on the LTE side to a very considerable extent.

In order for the 802.11 SCell to be used for data transfer, the 802.11 SCell is first added and then activated (following the terminology of LTE). By one approach the eNB is responsible for both the addition and removal of the SCell and also activation and deactivation thereof. Accordingly, by one approach the eNB makes the decisions to add/delete or modify the 802.11 SCell for a given UE. Such a decision can be based on any of a variety of factors (and any of a variety of combinations of such factors. Examples in these regards include but are not limited to, the volume of data, radio quality, Pcell and Scell loading, UE active bearers, subscription-related data, channel conditions, and mobility status. Further details regarding these factors are as follows.

Volume of data: The addition of an SCell will often be more appropriate for UE's that are generating large volumes of data. An eNB can know (based, for example, on history or subscription data) that a given UE is likely to generate large volumes of data either in UL or DL. In such a case the eNB can enable the 802.11 SCell when the UE has generated or consumed a high volume of data (that exceeds, for example, a predetermined threshold of data volume in a predetermined period of time or when the mean data rate measured over a predetermined period of time exceeds a given threshold).

Radio quality: Based upon the radio quality (as indicated, for example, by RSNI/RCPI as reported from the UE) the eNB can add the SCell when quality is good and remove the SCell when radio quality is bad.

Pcell and Scell loading: As one example, the eNB can add an SCell when the load on the PCell is above a first threshold and similarly can remove an SCell when the loading becomes lower than a corresponding second threshold (which may be the same as, or different than, the first threshold). As another example, the eNB can add an SCell when the load on SCell is below a threshold and refrain from adding an SCell when the load on SCell is above the threshold. As yet another example, when the resources on the LTE PCell are scarce (perhaps due to large number of UEs or a large number of data hungry UEs in the system) then the eNB may choose to enable an 802.11 SCell for applicable UEs.

UE active bearers: Active bearers that require high data rates (for example, particular data bearers that are known to be resource hungry when associated with high bandwidth applications) can prompt the addition/enabling of an 802.11 SCell. By one approach the type of traffic data and/or knowledge of running applications (and/or their status) can be mapped to active bearers and their respective tolerance to delay can further inform the addition/enabling and/or deletion of SCells by the eNB. By another approach the possible data rate over the 802.11 leg (as estimated by eNB based, for instance, on some assistance data from the UE) can inform this decision. Parameters such as RCPI and RSNI and/or 802.11 MCS scheme could be indicated by the UE to the eNB to facilitate this decision.

Subscription-related data: TCIW may be provisioned by the operators as a value-added service only to some customers and whether the 802.11 SCell is enabled or not may be based on such subscription data. For example, when the subscription data of the UE indicates a preference to use an 802.11 air interface when available, the eNB may decide to add (or to maintain) an 802.11 SCell based on that preference.

Channel conditions: The eNB can be configured to decide to add the 802.11 SCell to the UE experience if a channel condition measurement indicates a suitably strong 802.11 SCell or that the UE is associated with the 802.11 SCell (presuming, for example, a UE-controlled option for association). Conversely, if the measurement results indicate that the received signal strength/quality/load of the 802.11 SCell is poor (presuming a network-controlled addition option) or that the UE is disassociated with the 802.11 SCell (presuming a UE-controlled option) then the eNB may remove the 802.11 SCell for this UE.

Mobility status: For high mobility UEs, adding 802.11 SCells may not be appropriate as the UEs are likely to move from one SCell to another at a high rate and thus generate a lot of mobility-related signaling. This is especially of concern because the 802.11 SCell coverage zones are likely to be small in size and hence high mobility UEs are likely to move in and out of coverage at a rapid rate. Thus, an eNB may refrain from adding 802.11 SCells for high mobility UEs or remove an 802.11 SCell upon detecting an increased mobility rate where, for example, UE speed is beyond a predetermined threshold or the number of cell changes over a predetermined time exceeds a threshold rate. Conversely, for low mobility UEs, the eNB may add 802.11 SCells.

Activating an SCell enables the user plane over that Scell. The eNB may decide to activate the SCell based on one or a combination of factors. A non-exhaustive listing of possibly useful examples in these regards include:

When the data volume in downlink or uplink exceeds a threshold;

When the QoS requirements of the data (regarding, for example, data rate, latency, reliability) are deemed to be met using the 802.11 air interface;

When the load on the LTE PCell exceeds a threshold;

When the signal level, signal quality, load, and/or medium utilization factor on the 802.11 air interface falls below a threshold;

When the subscription data of the UE indicates a preference to use an 802.11 air interface when available;

When the UE indicates a preference to allow 3GPP usage of its available 802.11 hardware or processing resources;

When an LTE PCell RF level drops below a threshold.

Similarly, the eNB may decide to deactivate the SCell based on one or a combination of such factors as:

When the data volume in the downlink or uplink falls below a threshold;

When the QoS requirements of the data (regarding, for example, data rate, latency, and so forth) are deemed to be not met using the 802.11 air interface;

When the load on the LTE PCell falls below a threshold;

When the signal level, signal quality, load, and/or medium utilization factor on the 802.11 air interface exceeds a threshold;

When the subscription data of the UE indicates a preference to use an LTE air interface;

When the UE indicates a preference to disallow 3GPP usage of its available 802.11 hardware or processing resources;

When an 802.11 SCell RF level drops below a threshold.

By one approach these teachings employ a network-centric LTE-based mechanism to add/modify/delete an SCell operating in unlicensed spectrum via modifications made to the 802.11 procedures in order to fit in with the network-controlled LTE paradigm. As one illustrative example in these regards, the UE attaches to the cellular network and the (licensed) PCell using existing procedures. As part of this process the device is authenticated and is provided with an IP address/PDN connection for a default bearer. The device provides its capability information (including 802.11 capability) as part of the attach procedure.

When the eNB decides that it would be useful (or might in the future be useful) to add an unlicensed band SCell, the eNB uses RRC signaling (such as the RRCConnectionRecofiguration/measConfig message) to configure the device with the WLAN identifier such as the BSSID, ISM band(s), and channel(s) of the 802.11 SCell(s) for which the device should provide measurement reports. The eNB can also provide any thresholds for the measured metrics (such as thresholds for 802.11 radio signal strength or quality such as RCPI/RSNI metrics or any desired throughput estimate thresholds or the like) which the device should use for triggering the measurement reports.

Measurement metrics may be any metric that would reliably indicate the radio quality or signal strength. For instance this could be those metrics that are specified in 802.11, such as RCPI and RSNI. Measurements indicating estimated throughput on the WLAN AP may also be reported. Metrics such as channel utilization may also be included if desired.

The device would make measurements (for instance on the 802.11 beacons) of the provided WLAN and would report measurements to the eNB using RRC signaling when the measurement criteria are met (for example, when a given metric exceeds a threshold level).

Existing 802.11 passive or active scanning may be used to determine whether an access point belonging to a provided BSSID is in coverage and to determine the signal level/signal quality/current medium load or utilization level. These procedures may also be optimized using the information provided to the UE in the RRC measConfig signalling (e.g. band/channel number of interest). The measurement results can be reported by sending a MeasurementReport message containing the measurement results for the provided 802.11 BSSID.

The eNB may also receive certain parameters like the "Available Admission Capacity", "Station Count", and so forth from the 802.11 access point associated with the eNB for TCIW operation. These internal metrics may be passed on from the access point to the eNB via an internal interface.

Based on the received measurements from the UE and any information received on the internal interface between the 802.11 access point along with any other criteria of interest mentioned herein, an eNB may decide to add an 802.11 SCell for the UE. The eNB can inform the device using RRC signaling (such as the RRCConnectionReconfiguration message) regarding whether the 802.11 SCell is to be added/deleted/modified.

Depending on information included in the RRCConnectionReconfiguration message, there are at least two further options regarding how the UE may proceed further with attaching to the 802.11 network. Referring generally to the process 500 presented in FIG. 5, a first option is similar to the current LTE handover procedures where the eNB provides a handover command to the UE in which the target cell radio interface aspects are embedded. RRCConnectionReconfiguration is used for this purpose and this message provides all the relevant 802.11 access point capabilities and parameters to enable the UE to enter a state equivalent of the UE 802.11 State 3. For example, the RRCConnectionReconfiguration message tunnels the Association Response message that contains the necessary information for the UE to associate with the 802.11 access point. This approach presumes that the UE's access capabilities on the 802.11 side are known to the 802.11 access point.

Figure 5:
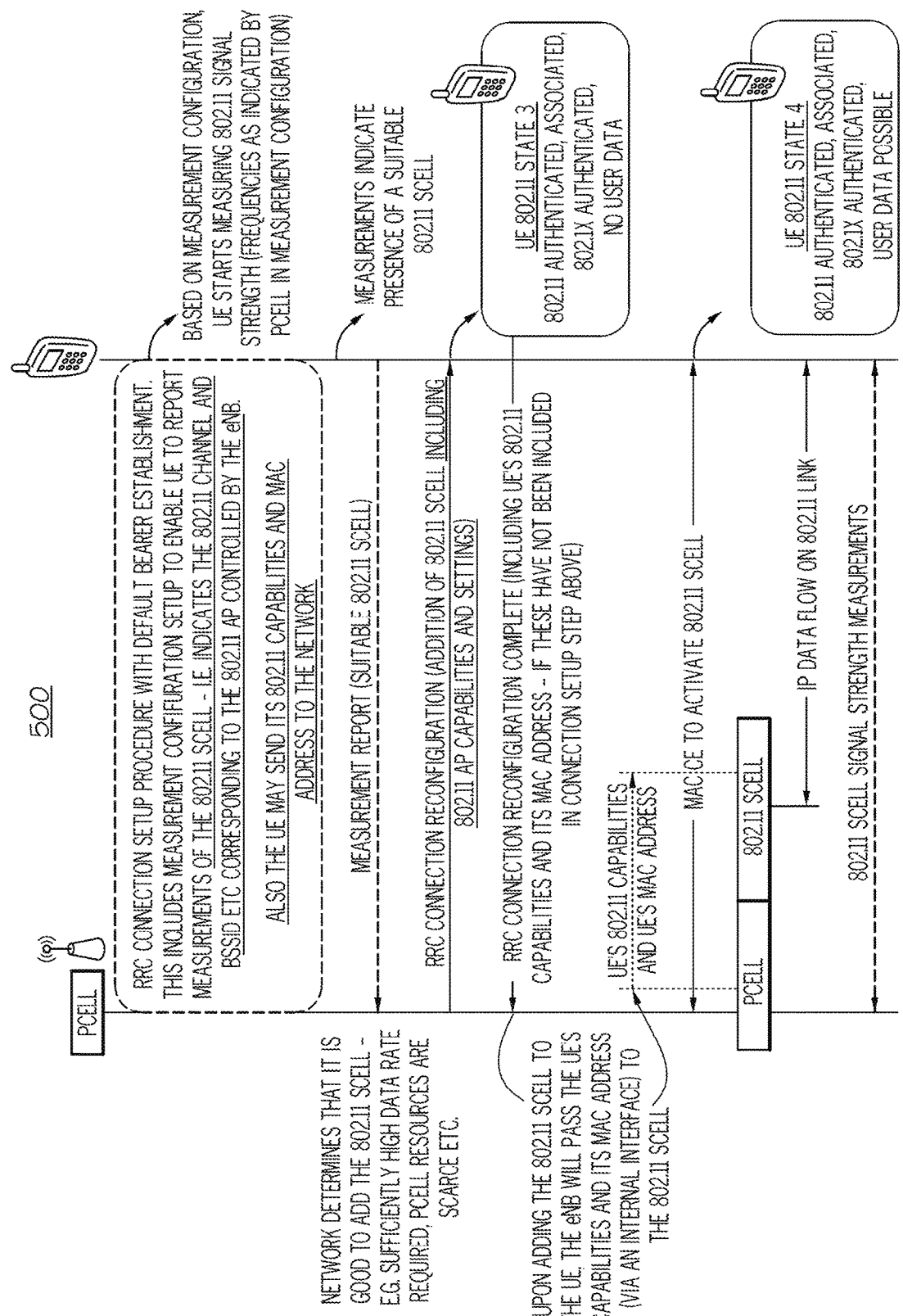
FIG. 5 is a call flow diagram in accordance with the disclosure.

The network receives the UE's 802.11 capabilities (e.g. included in the UE Radio Access Capabilities message exchanged during the LTE attach procedure or as sent by the UE in the RRC Connection Reconfiguration complete message) and these are passed to the 802.11 access point through an eNB internal interface as shown in FIG. 5. Once the RRC Connection Reconfiguration procedure is complete (i.e. upon reception of the RRCConnectionReconfiguration complete message), the eNB may activate the 802.11 SCell thus enabling user plane data transfer over the 802.11 interface (and allowing the UE to move to a state equivalent of the 802.11 state 4). Activating the SCell may be achieved using MAC signaling.

Figure 6:
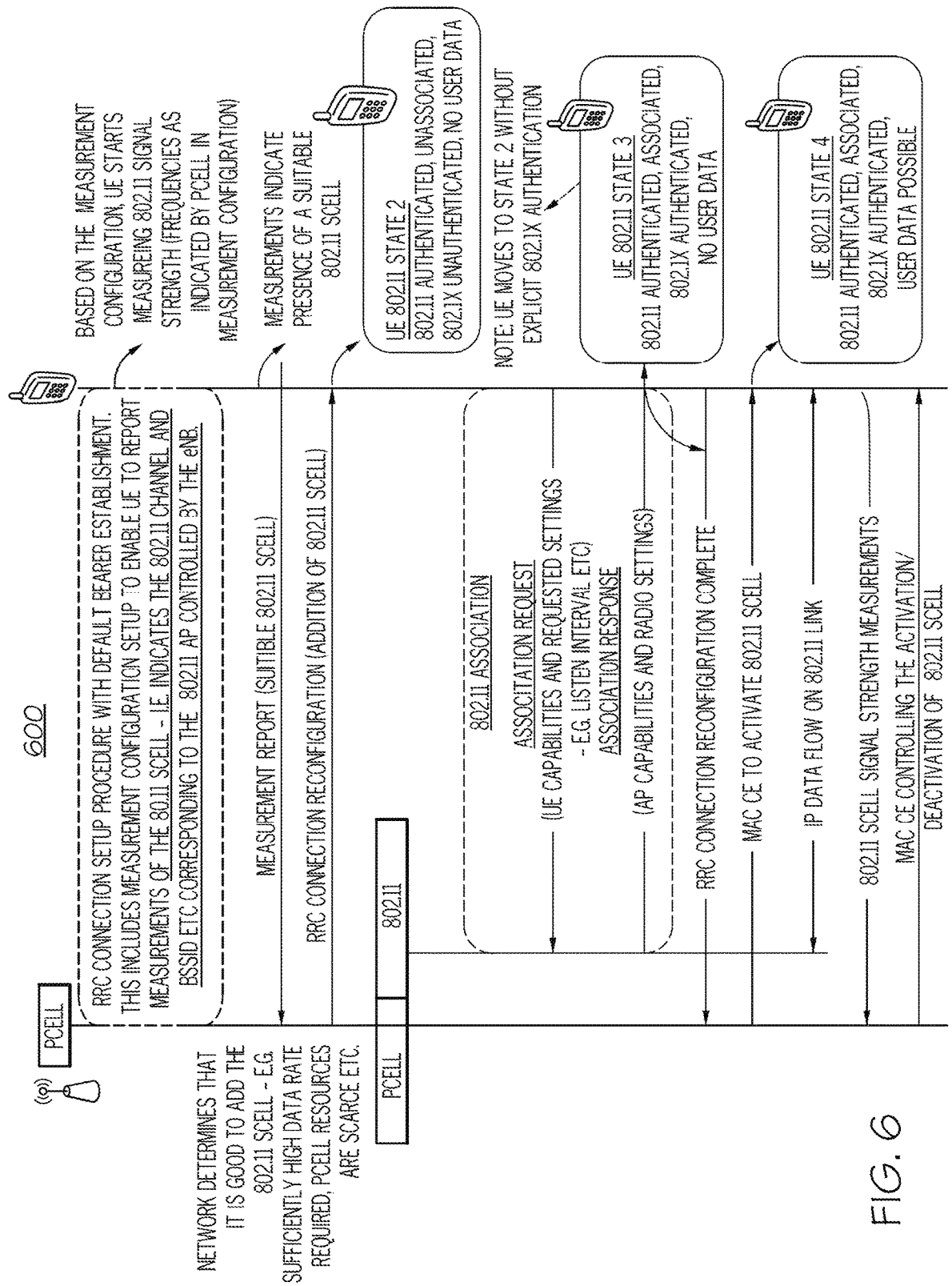
FIG. 6 is a call flow diagram in accordance with the disclosure.

Referring generally to the process 600 presented in FIG. 6, pursuant to a second optional approach the RRCConnectionReconfiguration message only provides an active trigger (or command) for the UE to associate with the 802.11 AP. Along with the trigger or command, the message may also include information such as the BSSID of the access point to which the UE is to associate. In this case, the UE enters a state equivalent to the 802.11 state 2 and initiates the 802.11 Association procedure as shown in FIG. 6. In this particular case, in moving from a state equivalent to the 802.11 state 2 to state 3 there is no explicit 802.1X authentication procedure. This is because, once authenticated on the 3GPP network (during the network attach procedure), a UE capable of TCIW operation is also pre-authenticated for TCIW operation.

In both options described above, the network expects the UE to associate with the 802.11 SCell upon receiving the RRCConnectionReconfiguration message that indicates addition of SCell. These teachings will also accommodate the eNB adding the 802.11 SCell for uplink and/or downlink operation.

Figure 7:
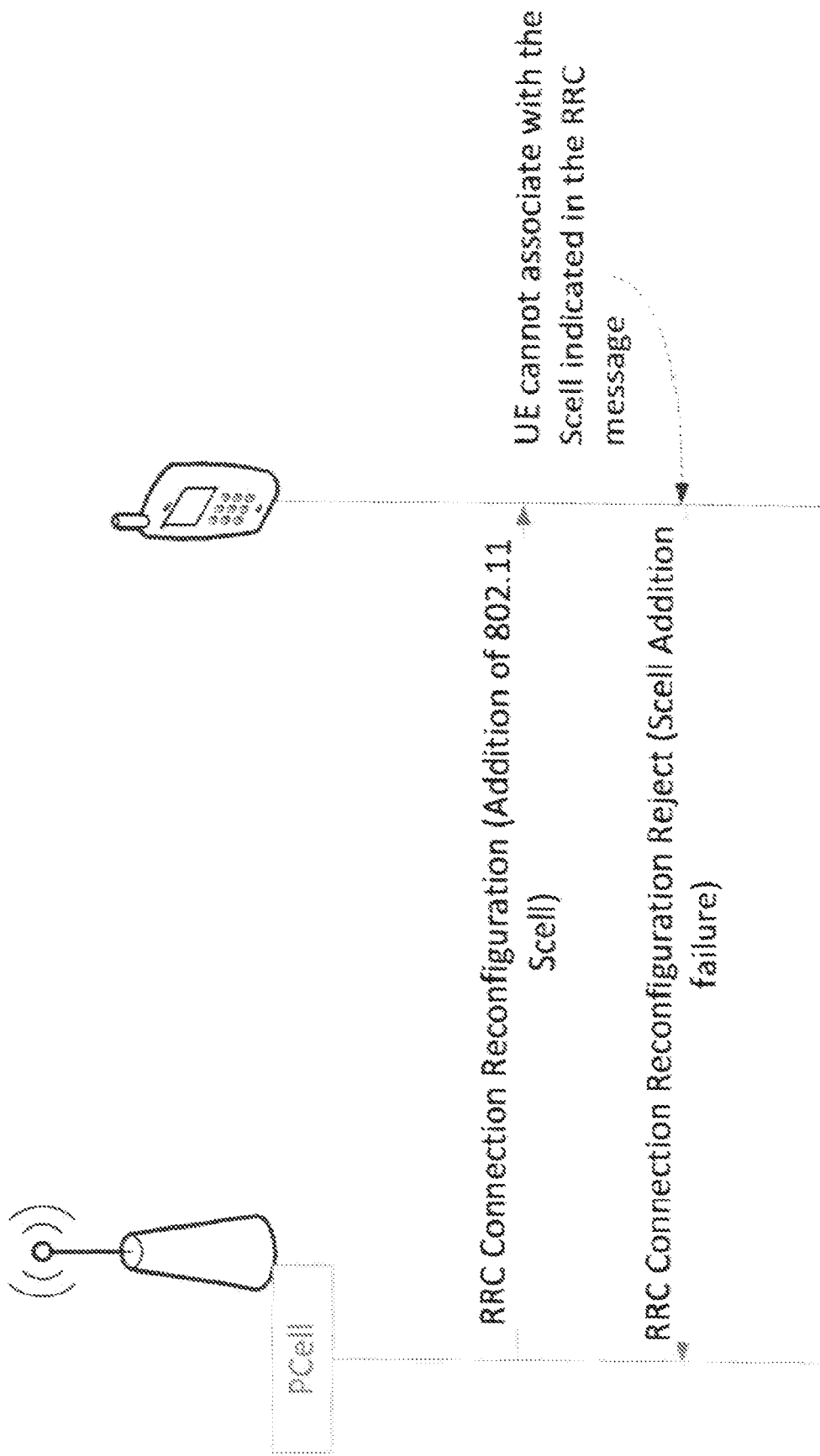
FIG. 7 is a call flow diagram in accordance with the disclosure.

The UE, however, may in some cases be unable to associate with the 802.11 SCell as indicated in the RRCConnectionReconfiguration message (for example, the 802.11 hardware might be currently used for other purposes). The UE may also refrain from sending measurement reports that would trigger addition of an 802.11 SCell as long as it is unable to associate with the SCell. However, after receiving the RRCConnectionReconfiguration message instructing the UE to associate with a given 802.11 message, if the UE is unable to associate with the 802.11 SCell, the UE may, for example, execute actions upon Reconfiguration failure as specified in 3GPP TS 36.331 section 5.3.5.5. Or, as another example, the UE may send an RRC message to indicate to the network that the addition of the SCell cannot be complied with as illustrated via the process 700 presented in FIG. 7. A new RRC message (RRCConnectionReconfigurationReject containing the failure cause—indicating inability to associate with the 802.11 SCell) might serve well when employing this approach.

After associating itself with the 802.11 network, the device can acknowledge the reconfiguration message using the RRCConnectionReconfigurationComplete message and then move to a state equivalent to the 802.11 state 3. By one approach the device will have supplied the eNB with an identifier to identify the device on the 802.11 SCell (for instance the MAC address of the UE), so that the inter protocol layer (bearer) bindings can be put in place. The 802.11 MAC address could be provided by the UE in the RRCConnectionReconfigurationComplete message or could have been provided earlier (for example, during cellular network attachment along with RRC capability exchange signaling).

Further, once the RRC Connection Reconfiguration procedure is complete (i.e. upon reception of the RRCConnectionReconfiguration complete message), the eNB may activate the 802.11 SCell thus enabling user plane data transfer over the 802.11 interface (and allowing the UE to move to a state equivalent to the 802.11 state 4). Activating the SCell may be achieved using MAC signaling.

It is also worth highlighting that compared to the normal way of obtaining IP connectivity over an 802.11 network, signaling associated with 802.11-based authentication (open authentication or WEP) or 802.1X-based authentication does not need to be used. Note also that the UE already has an IP address as provided by the PGW. Hence, the UE does not need an IP address specific to the wireless LAN interface (and hence does not need to perform any DHCP procedure). However, it may be advantageous from an implementation perspective to include the IP protocol (and possibly UDP as well), terminated below the LTE RLC layer, for example, to align the behavior for TCIW UEs with those using legacy WiFi at the same device.

Figure 8:
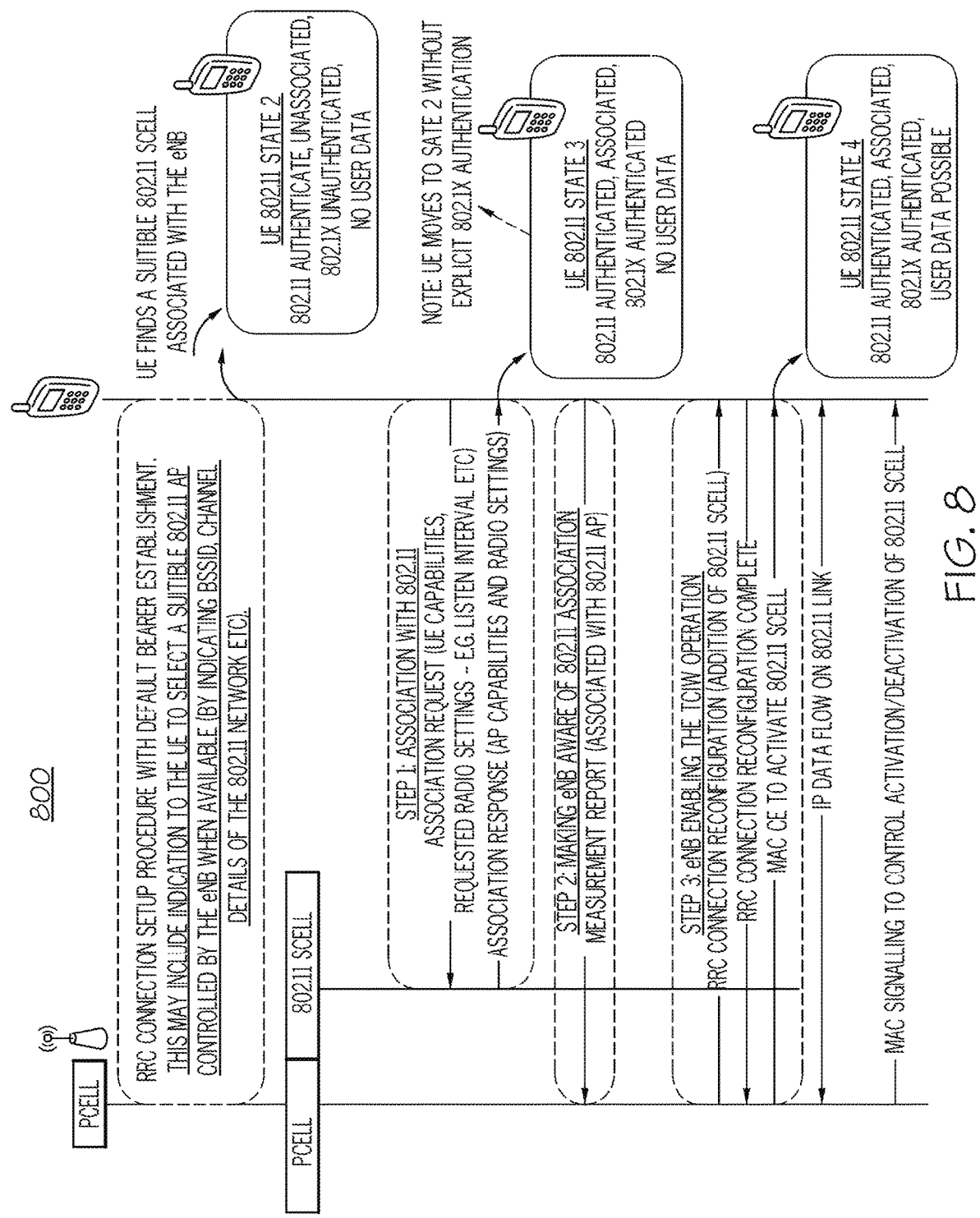
FIG. 8 is a call flow diagram in accordance with the disclosure.

As an alternative to the foregoing, and referring to the process 800 generally shown in FIG. 8, selection of the 802.11 network selection can be left to the UE. In this case the UE associates with an 802.11 SCell controlled by the eNB. Assistance information pertaining to the 802.11 SCell that is controlled by the eNB may be conveyed to the UE (either via dedicated signaling, a system information broadcast, or via pre-configuration in the UE). This assistance information may include details such as the BSSID (802.11 MAC address) of the 802.11 SCell of eNB and/or other information useful in measuring/associating with the SCell (such as, for example, RF Band and channel details of the 802.11 SCell controlled by the eNB).

As regards the aforementioned assistance information pertaining to the BSSID, this information can be provided either explicitly via an information element or derived implicitly by the UE based on a preconfigured relation (for example, by employing a known lookup table showing a relation between the Cell ID and 802.11 BSSID associated with the SCell) between the system information such as the PLMN or the cell ID of the LTE PCell. Other identifiers indicating an association of 802.11 SCells with a particular eNB may also be used, such as SSID or HESSID, in which case seamless link layer mobility within the access points belonging to the same SSID/HESSID would be possible.

After obtaining the details of the 802.11 access point associated with the eNB, the UE can associate with the 802.11 access point based on certain trigger criteria. One example in these regards includes the device associating with the 802.11 SCell at the earliest opportunity and in advance of the SCell actually being needed (the details of the 802.11 SCell to which the UE may associate with may be obtained either via broadcast signaling or dedicated RRC signaling). This approach can be useful to avoid a delay in associating at a time of need. Further, by pre-associating with the 802.11 SCell, the UE may also ensure that the 802.11 hardware resources (Wi-Fi chip hardware, firmware, or other processing capability) are used for connecting with the 802.11 SCell instead of connecting to another non-3GPP operator-controlled WLAN (as connecting to another non-3GPP WLAN might delay the SCell addition).

When the device cannot use its 802.11 hardware for associating with the 802.11 SCell controlled by the eNB, the device may refrain from associating. The device may not be in a position to associate with the 802.11 access point controlled by the eNB, for instance, if the 802.11 hardware is currently being used for other purposes like the UE being associated with another non-operator controlled 802.11 access point or the UE is engaged in a Miracast session or a Wi-Fi direct session. Once the device hardware becomes available for the 802.11 SCell controlled by the eNB, the device may then associate with the SCell.

Once the UE is associated with the 802.11 SCell, the UE enters a state equivalent to the 802.11 state 3. User plane data transfer is not yet possible on the 802.11 link. Similar to the network-controlled SCell addition described herein, the UE need not perform the explicit steps of 802.11 authentication (i.e. neither the 802.11 authentication nor the 802.1X authentication procedures are executed). The UE is pre-authenticated from an 802.11 perspective and hence the UE does not have to perform any further authentication procedures specific to 802.11 access.

The eNB is then made aware of the fact that the UE has successfully associated itself with this 802.11 SCell. By one approach, once the UE is associated with the 802.11 access point associated with the eNB, this association may either be explicitly communicated to the eNB by the UE or the eNB may know about the association state of the UE since the 802.11 AP is either an internal element of the eNB or is an external element connected via a suitable interface. The association state will be known at the 802.11 access point and the MAC address of the associated UE may be passed on to the eNB for this purpose.

For enabling the option of having the UE explicitly inform the network about this association status, a measurement report may be triggered upon successful association with the 802.11 access point and sent to the eNB. The eNB can infer from this measurement report that successful association has been achieved. Other UE-originated messages whose sending is contingent on successful association could also be used for this purpose (a MeasurementReport is just one illustrative example in these regards).

By one approach the MeasurementReport message used in LTE can be modified to accommodate such 802.11 SCell details. These changes could for instance be included in the MeasResults IE which is included in the MeasurementReport message as follows:

MeasurementReport (message exchanged between UE and eNB)
        MeasResults
Where MeasResults can include some or all of:
    MeasResults
        measResultPCell
        measResultNeighCells
            measResultListEUTRA
            measResultListUTRA
            measResultListGERAN
            measResultsCDMA2000
        measResultServFreqList-r10
        measResultServ802.11-r13 (new optional IE added to the MeasResults IE)
            BSSID of the 802.11 AP #1
                RCPI and RSNI (corresponding to the 802.11 AP)
                802.11 MCS scheme (an estimate of MCS scheme that could be used for the data transfer on the 802.11 leg)
                802.11 state {enumerated: UE 802.11 State 1, UE 802.11 State 2, UE 802.11 State 3, UE 802.11 State 4} (tells the network whether the UE has already associated or not with the 802.11 network controlled by the eNB)
                802.11 channel utilization
            BSSID of the 802.11 AP #N (similar field as above for the $N^{th}$ 802.11 SCell)

Upon receiving the above measurement report message, the eNB may then decide to add the 802.11 SCell and enable the user plane data transfer thus initiating TCIW operation. This step may be taken by the eNB, after receiving the information regarding successful association with the UE, based on certain implementation-dependent criteria such as those mentioned herein.

Addition of the 802.11 SCell can be performed using the RRCConnectionReconfiguration procedure. Once the RRC Connection Reconfiguration procedure is complete (i.e. upon reception of the RRCConnectionReconfiguration complete message), the eNB may activate the 802.11 SCell thus enabling user plane data transfer over the 802.11 interface (and allowing the UE to move to a state equivalent to the 802.11 state 4). Activating the SCell may be achieved using MAC signaling. The UE can now be informed that it is allowed to route data plane over this 802.11 SCell.

As is done with the current carrier aggregation operation in LTE, the eNB may activate or deactivate an SCell that has been added for a given UE. By deactivating the 802.11 SCell when there is no need for data transfer, the eNB may provide the UE with a means to save batter power (by eliminating a need to monitor the 802.11 SCell). Deactivation of the 802.11 SCell instead of removing it enables the eNB to reactivate it at a later stage without sending a full RRC Reconfiguration message.

By one approach the 802.11 SCell needs to be activated only when there is data to be offloaded on to the 802.11 SCell. A UE may still stay associated with the 802.11 SCell even when there is no user plane data or when the SCell is deactivated. In case of normal LTE SCell operation, this is achieved using MAC signaling. The present teachings will accommodate a procedure similar to this but adapted to 802.11 operation to provide for activation and deactivation of an 802.11 SCell.

Figure 9:
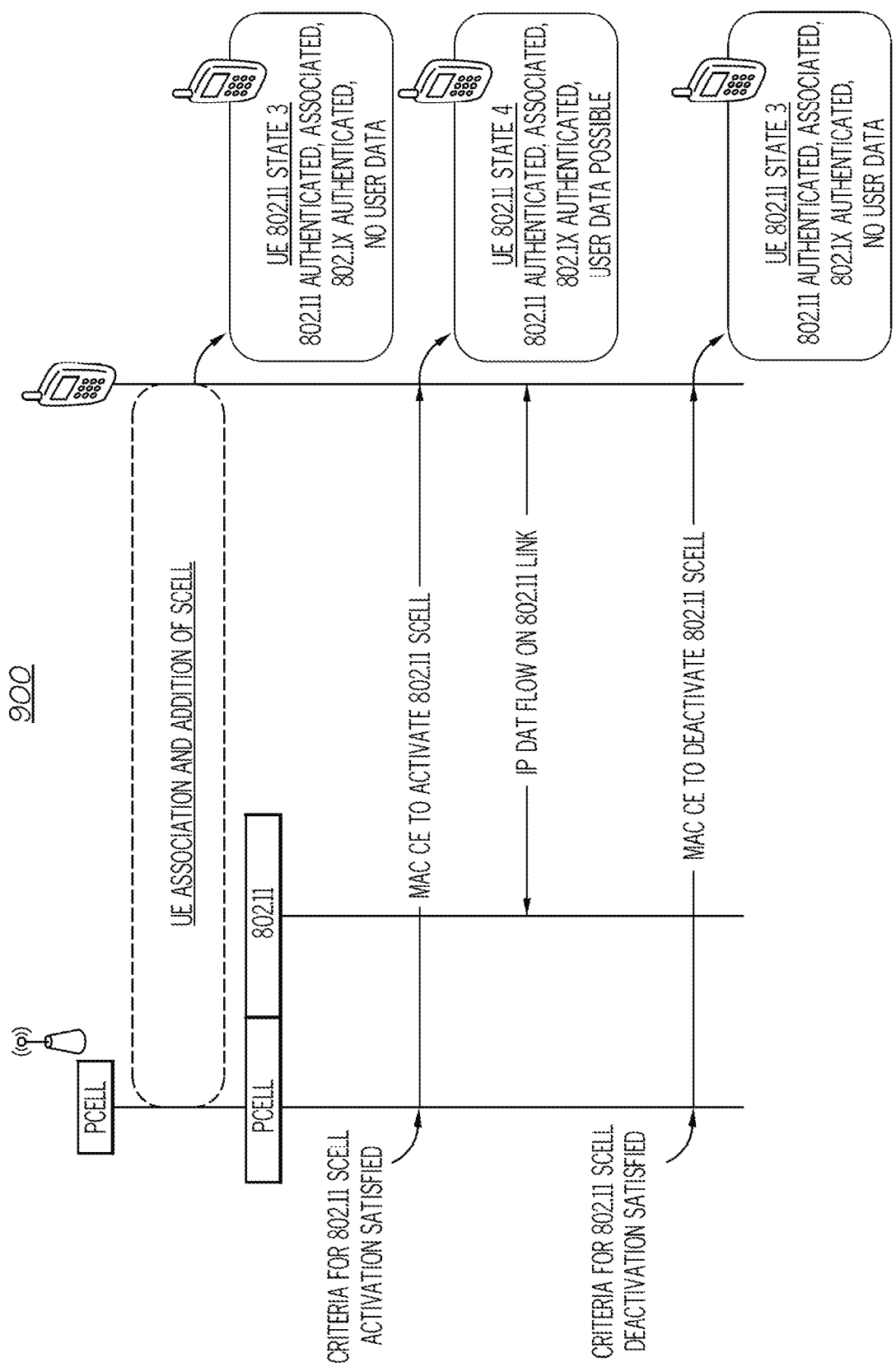
FIG. 9 is a call flow diagram in accordance with the disclosure.

To control the activation and deactivation of the 802.11 SCell, the existing Activation/Deactivation MAC CE could be used (see, for example, 3GPP TS 36.321). Existing MAC CE practices would, however, either activate or deactivate both the uplink and downlink of the specified SCell. There may be situations where the network may want to control the UE's transmissions on the uplink. A semi-static mechanism of control over uplink transmissions may be achieved by activating and deactivating uplink and downlink links separately. New MAC CEs could be used to achieve this. Referring generally to the process 900 shown in FIG. 9, such MAC CE-based signaling may be used to toggle the UE between states which do/do not permit user plane data transfer. Specifically, the UE can be moved to a state equivalent to the 802.11 state 4 upon activation of a given 802.11 SCell and then moved to a state equivalent to the 802.11 state 3 upon deactivation.

As shown above, the activation and deactivation of the 802.11 SCell may depend on implementation-dependent criteria. For instance, the network may decide to activate or deactivate the SCell based on one or a combination of factors of choice including various factors as are identified herein.

There may be instances when the UE cannot comply with the MAC CE activating data transmission on a given 802.11 SCell. In this case, the UE may need to inform the eNB that it cannot use its 802.11 hardware for TCIW operation. By one approach the UE can send a new MAC CE to the eNB to specifically communicate such a situation. The information may be specific to only the uplink, only the downlink, or to both the uplink and the downlink.

In these examples the LTE PCell acts as the mobility anchor and also terminates the RLC and PDCP layers in the user plane. Hence, it can be useful that the UE communicates with the LTE PCell in order for it to exchange data with the eNB. Accordingly, if the UE loses communication with the LTE PCell or if there is a handover from one eNB to another (and hence a change in the LTE PCell), then the present teachings will accommodate releasing the 802.11 SCell. If appropriate a new 802.11 SCell can then be added after re-establishing the connection on the target LTE PCell (target eNB). In order to facilitate a quick addition of the new 802.11 SCell, details of the 802.11 SCell (such as BSSID, 802.11 band or channel, and so forth) controlled by the target LTE eNB may be provided in the handover command (the information being provided, for example, by the target eNB).

Depending on the relative sizes of the LTE and WLAN coverage areas, it might be more common for the UE to move in and out of 802.11 coverage whilst it is associated with a given eNB. The measurement reporting procedure can be used by the LTE PCell as a means to understand the quality of the 802.11 SCell (in the case of the network controlled option) and the association status of the UE (in the case of the UE controlled option). Thus, in both cases, the eNB is eventually made aware of the state of the UE's connection with the 802.11 access point using the measurement reporting procedure. The network may then use various criteria in addition to the information contained in the UE's measurement reports to decide when to add/remove the 802.11 SCell.

The RLC transmitter entity in the case of downlink traffic resides in the eNB and in the case of the uplink resides in the UE. Both the LTE and 802.11 MAC entities in either the eNB or UE may visit their local RLC entity to pull data of a given size ready for transmission. In the case of LTE MAC, the pulled data depends on the grant size (as determined by the LTE MAC scheduler entity in the eNB and which may for example be based on UE Channel Quality Indications (CQI) or buffer volume information). In the case of the 802.11 MAC, a pseudo grant size may be indicated to the LTE RLC entity (to conceal from the RLC the fact that it is in fact an 802.11 MAC that exists below it and thereby to minimize impacts to the existing RLC layer design).

By one approach this pseudo grant size may be preconfigured. For example the pseudo grant size may have a value that is fixed and in the region of an IP packet size such as 1500 bytes (which is a size that the 802.11 MAC is used to handling).

By another approach this pseudo grant size may be calculated dynamically, either by the 802.11 MAC/LLC or an inter-AT scheduling layer such as the 802.11ak and/or an 802.1AC protocol layer, based on a number of factors (solely or in combination) such as:

- Any available 802.11 air interface metric (available over an SAP provided by a protocol layer such as the 802.11ak and/or 802.1AC). Examples of 802.11 air interface metrics include (mean throughput available on the 802.11 side, a measure of 802.11 load, Contention Window/Backoff-Window sizes on the 802.11 side, current MCS operational in the 802.11 side, and mean MAC delay on the WLAN side);
- QoS parameters of the active traffic;
- An allowable medium occupancy threshold or value (it may be desirable to limit the degree to which the 3GPP system accesses the unlicensed spectrum in order to constrain its impact on other users or systems); and
- An allowable maximum packet duration (e.g. it may be desirable to avoid longer packets in the case of highly latency sensitive services, or to ensure that not too much data transfer is attempted via the 802.11 leg in scenarios where there is a high probability of contention on the medium—high load).

By another approach the eNB (perhaps using one or more of the factors above) could send enough data to the 802.11 MAC such that the transmission over the physical layer is expected to take a predetermined period of time (for instance, 1 ms transmission time over the air could be targeted to match the LTE TTI length and current LTE scheduling granularity). The amount of data to provide to the 802.11 MAC would then depend on the mean throughput on the 802.11 side, number of users to be served, expected contention/backoff periods, 802.11 MCS, and so forth. These parameters may be extracted from the 802.11 MAC/Phy or provided by an intermediate protocol layer such as 802.11ak and/or 802.1AC.

Figure 10:
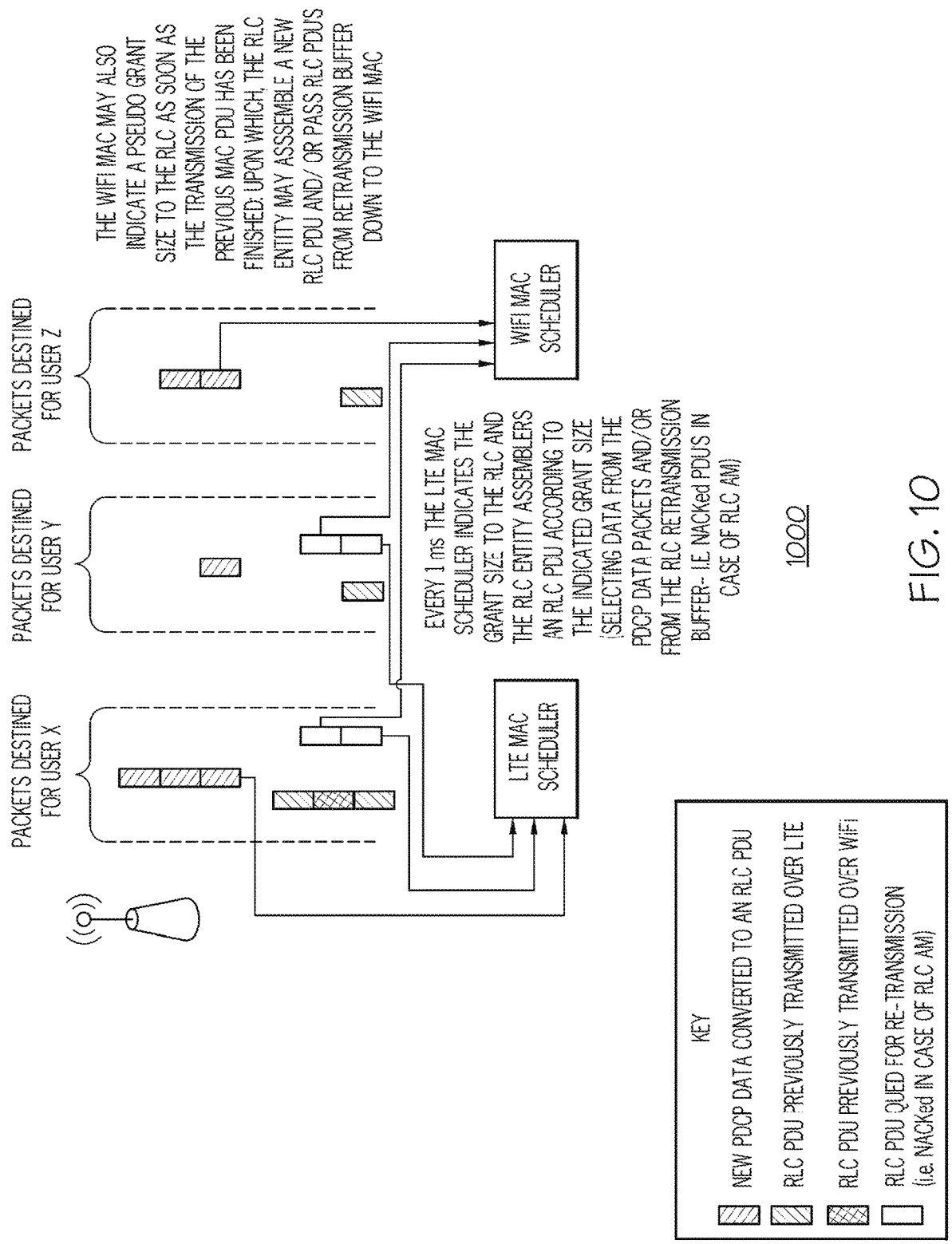
FIG. 10 is an architectural representation in accordance with the disclosure.

With reference to the architectural representation 1000 shown in FIG. 10, the LTE MAC entity may visit the local RLC entity synchronously every 1 ms to pull down data of the "grant" size as per the current LTE operation. Also, the MAC entity may visit the RLC entity asynchronously, whenever the 802.11 MAC has finished transmission of its last frame, to pull the next set of RLC PDUs of the pseudo grant size to be transmitted over the 802.11 interface. To enable this, an intermediate protocol layer such as the 802.11ak or 802.1AC can provide an indication to the RLC layer upon the 802.11 finishing transmission of the previous frame. The RLC entity can either assemble new RLC PDU(s) (from the buffered PDCP data) or segment or concatenate RLC PDU(s) from the retransmission buffer (in case of RLC AM) and pass the RLC PDU(s) to the lower layer for transmission over the 802.11 interface.

Figure 11:
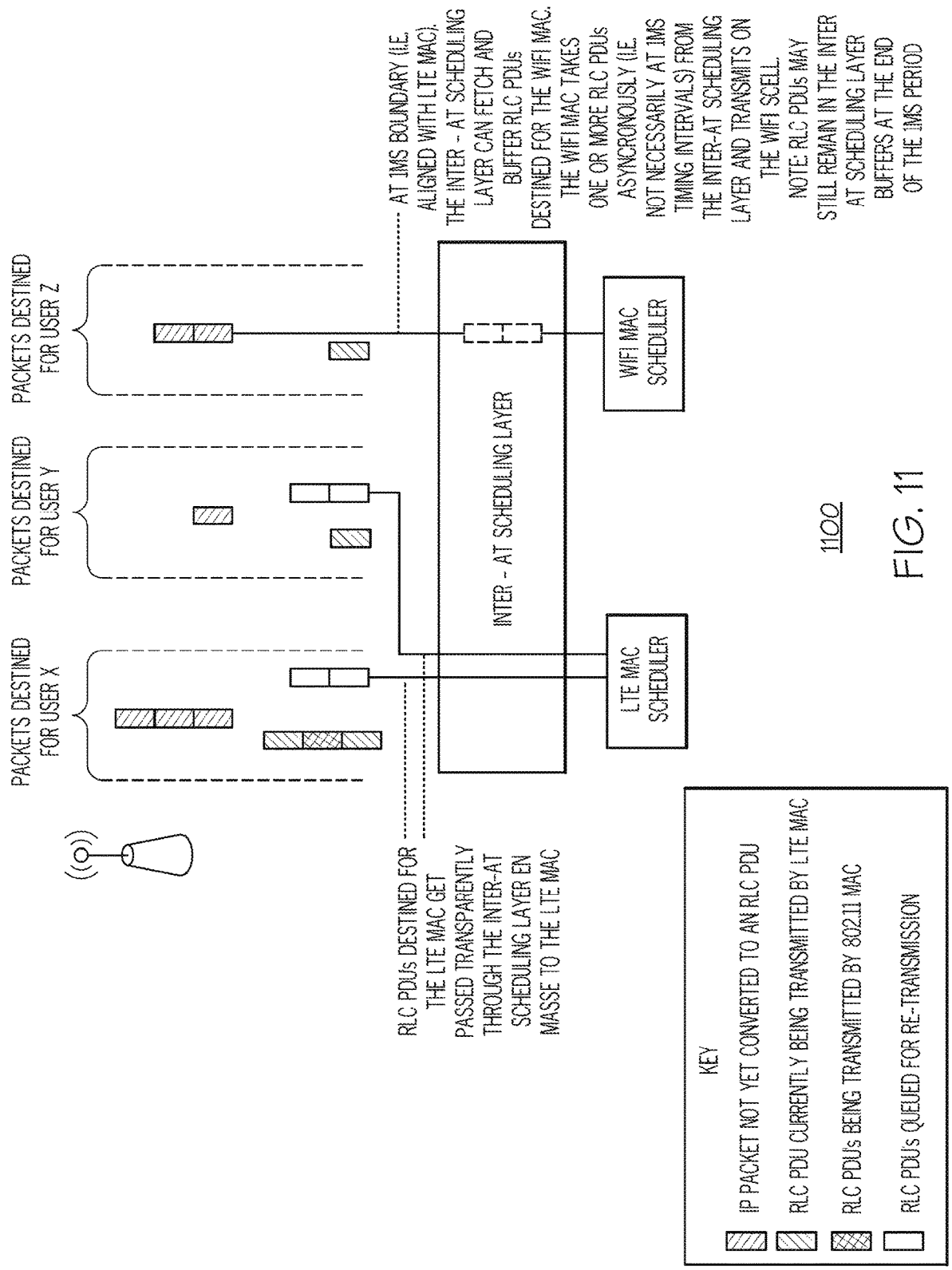
FIG. 11 is an architectural representation in accordance with the disclosure.

Referring generally to the architectural representation 1100 shown in FIG. 11, an alternative approach to the above is to use the inter-Access-Technology (inter-AT) scheduling layer as an intermediate layer between the MAC and RLC layers. This inter-AT scheduling layer may act completely transparently to the LTE MAC whilst it may interface with the 802.11 MAC such that it presents itself to the RLC layer above as another LTE MAC layer. For instance, this layer may visit the RLC layer synchronously at 1 ms time intervals and pull and buffer RLC PDUs for transmission through the 802.11 SCell. Some or all of the services provided by this inter-AT scheduling layer may be incorporated into a protocol layer such as the IEEE 802.11ak and/or IEEE 802.1AC.

In the case of LTE, the eNB scheduler knows the amount of data in the UE buffer based on the received BSR from that UE. The eNB schedules a given UE on the uplink by granting uplink resources for transmission. The eNB hence can update its own understanding of pending uplink data based on the indicated BSR and the size of uplink grants sent to the UE. When, however, both the LTE PCell and the 802.11 SCell are enabled, the eNB may not be able to keep track of the amount of pending uplink data at the UE based on the BSR and the history of grants on the LTE side because the UE may also be autonomously sending uplink data without explicit grants using the 802.11 SCell.

Accordingly, by one approach, when the UE provides a BSR it reports all the data it has buffered to the eNB and the eNB takes into account the uplink data it has successfully received both on the LTE PCell and on the 802.11 SCell in calculating the current pending uplink data in the UE buffer. The eNB can then make an appropriate resource grant to the uplink LTE MAC.

Even though the UE reports all the pending data in the BSR, the eNB may choose not to send a grant (or enough grants to clear the pending data in the buffer) on the LTE PCell, thereby implicitly indicating to the UE that the UE is expected to send all (or most of) the data via the 802.11 SCell. This may be acceptable for certain applications that are operating on a best-effort basis. For applications that require a minimum QoS guarantee, however, this may not be suitable if the data rate on the 802.11 SCell falls below a necessary corresponding threshold. In this case, the UE may indicate to the network a need for an improved level of service via the 802.11 SCell. A new MAC CE may be used to indicate such a state. As an alternative, the UE can also send a UE assistance message indicating that a power optimized configuration is not preferred (i.e. QoS should be prioritized over power consumption).

By another approach the UE can estimate the proportionate throughput it would expect to achieve on the 802.11 SCell based on factors like current MCS, loading on SCell, or a historical measure of throughput on the 802.11 SCell (to note but a few useful examples in these regards) and modify accordingly the volume of traffic that it reports in the BSR so that the LTE MAC scheduler will only see the remaining data volume that would actually be sent on the LTE PCell. For example, if the device had measured a throughput on 802.11 over a predetermined period of time (such as the last 10 seconds) of 1 Mbit/s and a throughput on LTE of 0.5 Mbit/s, then 802.11 is accounting for ⅔ of the device throughput and LTE is accounting for ⅓ of device throughput. If there are 10 kbytes buffered then the device would report a traffic volume of 3.33 kbytes in its BSR to the LTE PCell and would expect that the 802.11 leg will be able to serve the remaining 6.67 kbytes of data. If during the transfer of the data the throughput over 802.11 or LTE were to change significantly (for example, beyond a predetermined threshold) then a new BSR may be triggered again to account for the change in the situation. For instance, the UE may keep track of its indicated BSR size to the LTE leg and if the total data scheduled over LTE uplink equals or exceeds the indicated BSR size (whilst there is still some pending data in the UE buffer—i.e. the data rate over LTE leg becomes faster than expected or the data rate over 802.11 leg becomes slower than expected) then the UE may indicate a new BSR to the eNB.

By one approach at least some of the foregoing options can further include having the UE mark a set of PDUs (for which an LTE uplink resource has been granted as being not for 802.11 SCell scheduling). When the 802.11 MAC next inspects the queued traffic to pick the next RLC PDU(s) for scheduling over the 802.11 SCell, it would know not to pick one of the RLC PDUs/IP packets that are so marked.

Figure 12:
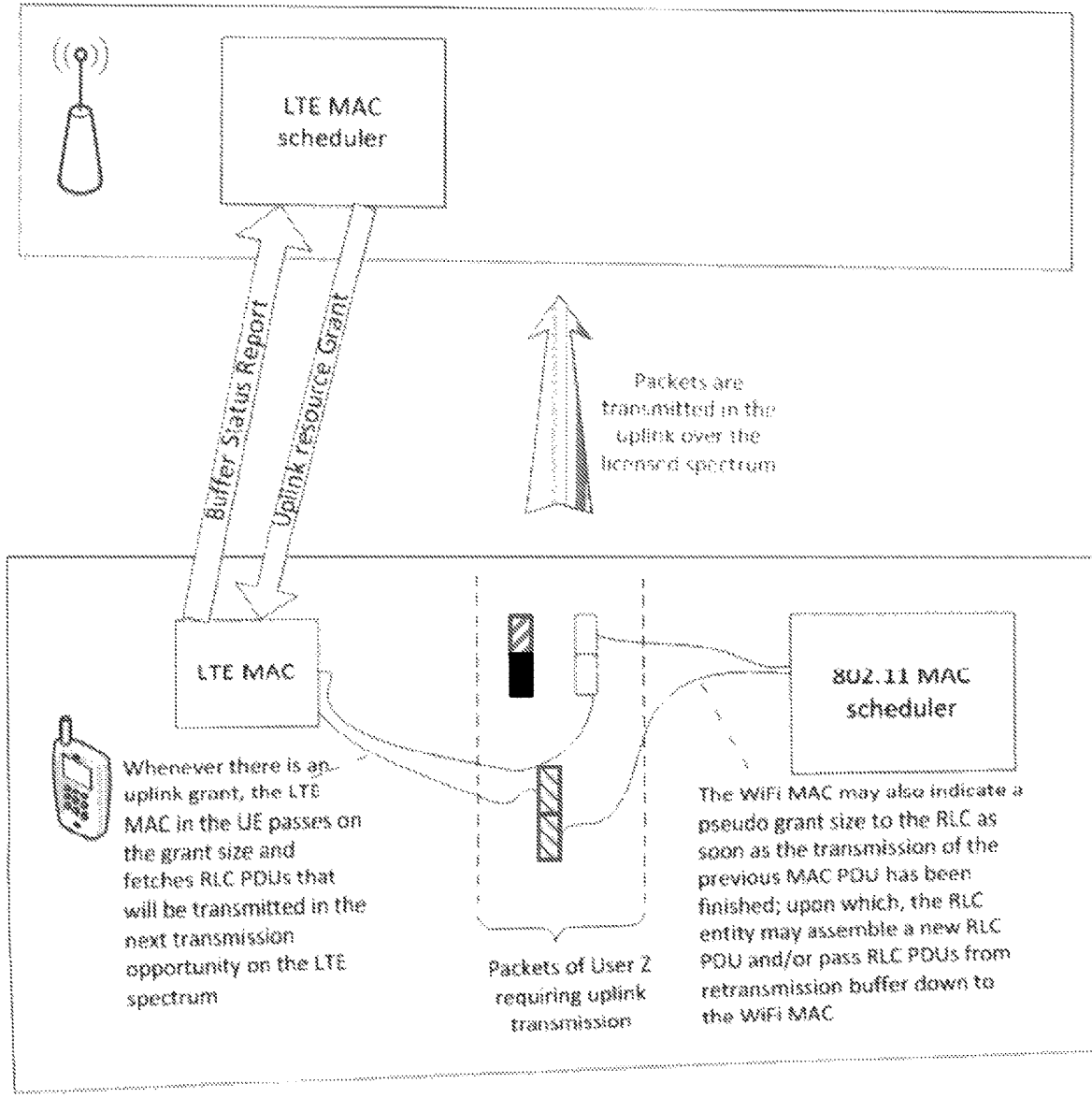
FIG. 12 is an architectural representation in accordance with the disclosure.

Referring generally to the architectural representation 1200 shown in FIG. 12, the RLC transmitter entity in the case of uplink resides in the UE. The handling of data at the RLC is very similar to the downlink. FIG. 12 illustrates specifically an uplink transmission when there is no (asynchronisity-hiding) inter-AT scheduling layer between the RLC and the MAC entities. In the case of 802.11 SCell uplink activity, the grant size is a pseudo-grant size as determined by the UE as described above. The UE then assembles an 802.11 MAC PDU as per that pseudo grant size. The UE may apply the current logical channel prioritization rules (see 3GPP TS 36.321) to populate the MAC PDU with data from different logical channels and pass this on as the 802.11 MAC data frame for transmission.

Figure 13:
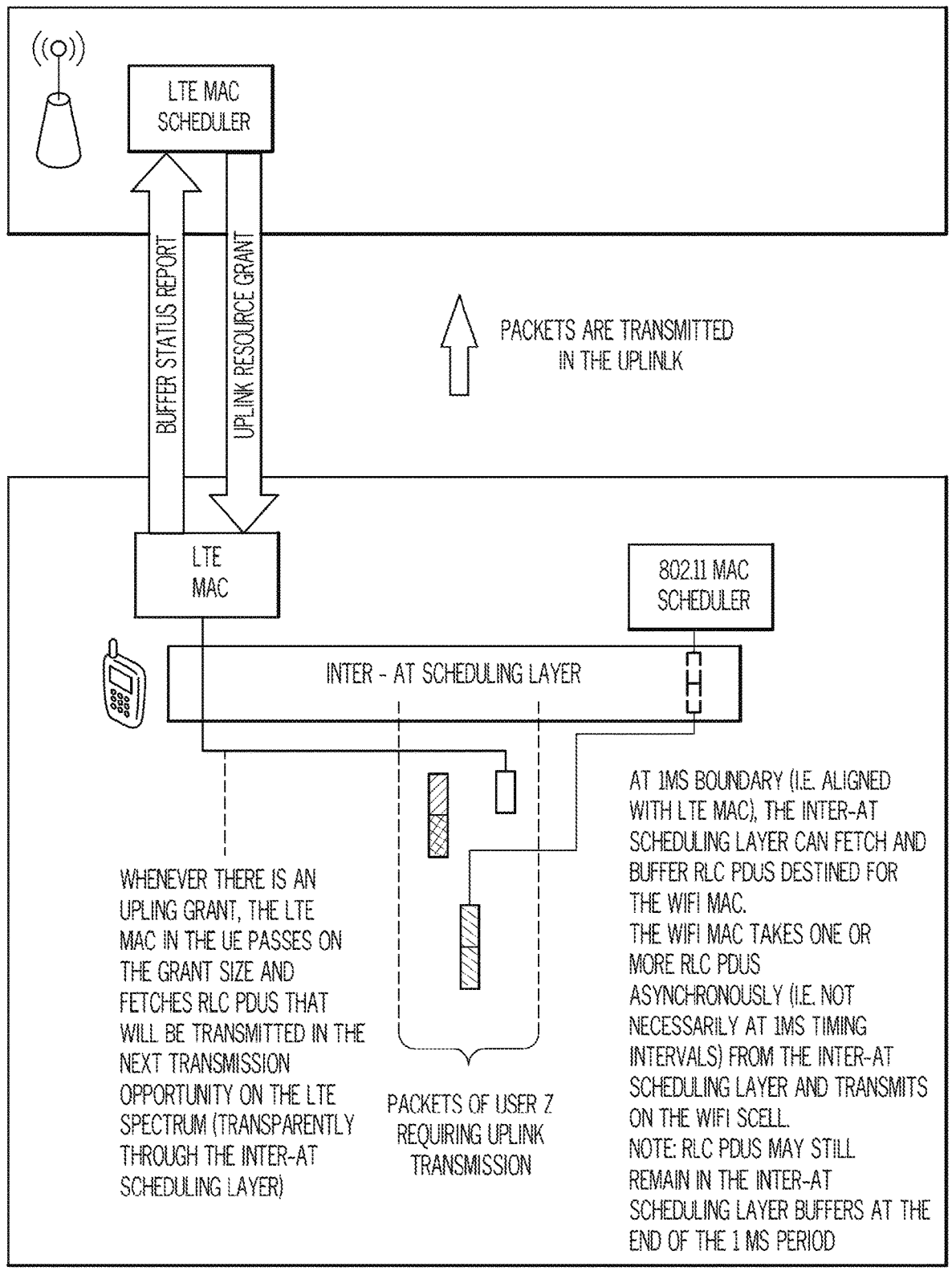
FIG. 13 is an architectural representation in accordance with the disclosure.
Figure 14:
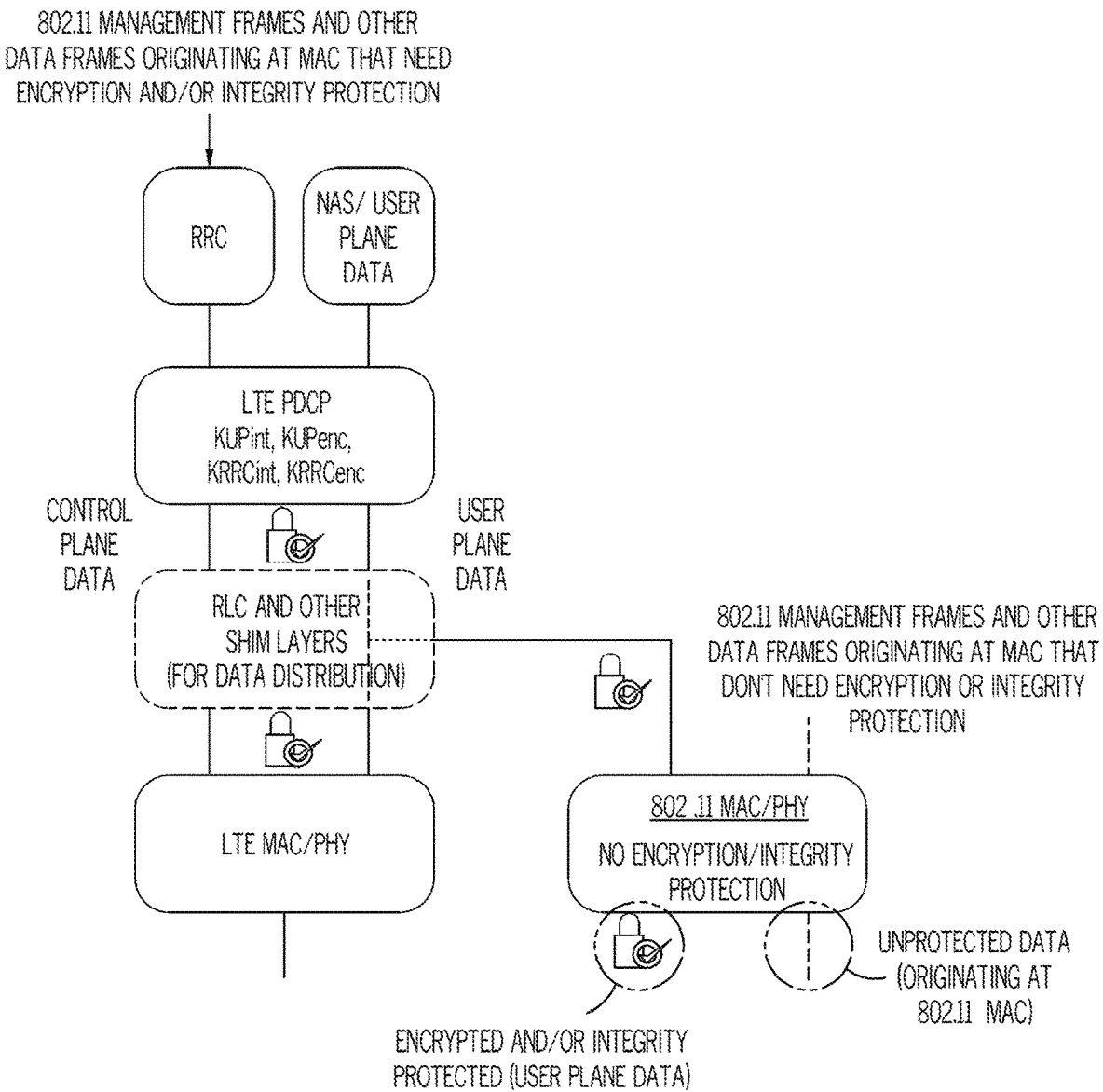
FIG. 14 is an architectural representation in accordance with the disclosure.

The architectural representation 1300 shown in FIG. 13 depicts the uplink handling with an inter-AT scheduling layer between the RLC and MAC entities (to hide from the RLC layer the asynchronous nature of the 802.11 MAC). Some or all of the services provided by this inter-AT scheduling layer may be incorporated into a protocol layer such as IEEE 802.11ak and/or IEEE 802.1AC.

In a system in which a radio bearer could be mapped to either WLAN or 3GPP, it may be desirable to allow configuration of whether a particular radio bearer may be routed over only LTE CCs (i.e. LTE PCell and its component carriers and any LTE SCell and its component carriers), only over 802.11 SCell(s), or over a mixture of LTE CCs and 802.11 SCell(s). Alternatively, the configuration could be defined to indicate whether a particular radio bearer may be routed over only licensed carriers, only over unlicensed carriers, or over a mixture of both licensed and unlicensed carriers.

The configuration of the bearer could be determined either at the eNB based on the received QoS information of the bearers whilst they are setup or the core network node (MME) may explicitly indicate this when the bearer is setup. This may for instance be based on subscription data. Alternatively this may be done per UE or per eNB. The option for the explicit indication from the core network would likely involve new signaling between the MME and the eNB.

Table 1, shown below, presents a message to be sent by the MME and is used to request that the eNB assign resources on Uu and S1 for one or several E-RABs.

TABLE 1

MME message

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item IEs | | 1 . . . <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | EPC TEID. | — | |
| >>NAS-PDU | M | | 9.2.3.5 | | — | |
| >>Correlation ID | O | | 9.2.1.80 | | YES | ignore |
| >>SIPTO Correlation ID | O | | Correlation ID 9.2.1.80 | | YES | Ignore |
| >>E-RAB Routing | O | | ENUMERATED (Licensed carriers only, Unlicensed carriers only, Licensed and unlicensed carriers) | | — | |

As a further alternative, a new type of radio bearer configuration could be defined to indicate "Mixed mode radio bearer" wherein it could be stated in the corresponding specifications that RLC PDUs of this radio bearer type may be transmitted over either 802.11 (e.g. unlicensed) or LTE (e.g. licensed).

By one approach, when scheduling PDUs of a bearer over either licensed or unlicensed spectrum, the MAC of the chosen access technology could continue attempting to transmit a data packet (e.g. MAC SDU) until it has run out of time (e.g. a defined time period measured in milliseconds)

or until a maximum number of retransmission attempts have been made, at which point the data packet/MAC SDU could be discarded. The associated max-time or max-retry value could be preconfigured (e.g. specified in the corresponding specifications) or derived autonomously by the eNB or UE (e.g. based on the QCI assigned to the radio bearer(s) in question), or could be signaled to the UE or eNB from another network entity (e.g. a core network node in EPC). As a further possibility, the eNB could derive the max-time or max-retry value (e.g. based on the QCIs) and could signal this value to the UE to use for its uplink transmissions. The eNB may signal these values to the UE in the MAC configuration for the 802.11 SCell.

By one approach the network controls whether the UE is allowed to steer traffic of a given bearer to 802.11 SCell or not. In some cases, it may be beneficial to base this decision on a per UE basis. This decision can be based, for example, on the subscription data available at the core network. For example, if the UE is subscribed for offloading to an 802.11 SCell when available then the UE may be configured with TCIW operation. If the subscription data doesn't allow this, then the UE will not be configured with an 802.11 SCell and hence TCIW operation will be not possible.

Such per-UE signaling may also be sent from the core network node to the eNB. Also, the control may be based on a per-eNB basis (i.e. an eNB may or may not be allowed to resort to TCIW operation under the control of the core network). Specific signaling between the core network nodes and the eNB may be provided to enable per-UE level control and/or per-eNB level control of TCIW operation.

If this general approach were to be used for supporting delay-sensitive traffic, by one approach a mechanism could be provided to ensure that the resulting RLC PDU loss rate (due to the packet discards) does not become too excessive. Such a mechanism could comprise providing some feedback from the 802.11 MAC into the Inter-AT scheduling layer to inform the Inter-AT scheduling layer of any MAC PDU discarding and/or problems/delay in transferring data. If packet loss rate/re-transmission rate/delay becomes too high then the Inter-AT scheduling layer could start diverting RLC PDUs of delay sensitive mixed mode bearers to LTE.

If this approach were adopted a mechanism might also be further utilized to ascertain when the traffic of delay-sensitive mixed-mode bearers (i.e. a bearer that had been re-routed over LTE) could once again start to have frames carried over 802.11. One option could be to monitor transmission performance of non-GBR traffic that is being carried over unlicensed spectrum for that user. If non-GBR traffic is being conveyed with low delay (and/or without excessive retransmission) then the Inter-AT scheduling Layer could start again to route delay sensitive traffic towards the 802.11 MAC. Another option would be to attempt sending the occasional real-time bearer associated RLC PDU (such as every $10^{th}$ or every $100^{th}$ PDU) over WLAN and monitor the resulting performance to see whether it is conveyed sufficiently quickly. If the results appear at least adequate then a greater proportion of GBR traffic could be routed towards 802.11.

By another approach to scheduling PDUs of a bearer over either licensed or unlicensed 802.11, an RLC PDU (for either uplink or downlink) is forwarded initially to the 802.11 MAC for transmission. If the 802.11 MAC fails to deliver the PDU within a sufficient (pre-determined) time (or within a pre-determined number of transmission attempts) the 802.11 MAC gives up trying to transmit the PDU. If desired, instead of discarding the PDU the PDU is returned to the (transmit side) RLC and marked as being for transmission on LTE (the marking could also include some indication of the urgency with which LTE should send the packet).

The associated max-time or max-retry value could be derived autonomously by the eNB or the UE based, for example, on the QCI assigned to the radio bearer(s) in question. By another approach this information could be signaled to the UE or eNB from another network entity (such as a core network node in EPC). As a further possibility, the eNB could derive the max-time or max-retry value (based, for example, on the QCIs) and could signal this value to the UE to use for its uplink transmissions. The reverse situation could also be supported (i.e. if LTE fails to deliver the RLC PDU within a given time then the RLC PDU could be returned to the RLC and marked for transmission on 802.11).

The signaling used in configuring the radio bearer may therefore also indicate to the UE and/or the eNB how long an attempt could be made to transmit an RLC PDU on the first access technology (or for how many retries) before the attempt should be aborted and a re-attempt made using the second access technology. (Those skilled in the art will understand and appreciate that this mechanism purely concerns behavior at the MAC layer and does not rely on presence or acknowledgements at the RLC layer.)

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
   a cellular wireless transceiver that employs licensed wireless spectrum to communicate with a base station;
   an unlicensed wireless spectrum transceiver that employs unlicensed wireless spectrum to communicate with a Wireless Local Area Network (WLAN) access point;
   a control circuit operably coupled to the cellular wireless transceiver and the unlicensed wireless spectrum transceiver and configured to:
   transmit, to the base station, a first identifier comprising a first medium access control (MAC) address of the unlicensed wireless spectrum transceiver;
   receive from the base station a Radio Resource Control (RRC)-based message to cause the apparatus to connect to the WLAN access point, wherein the WLAN access point is identified by the RRC-based message;
   associate with the WLAN access point in response to receiving the RRC-based message; and
   transmit an RRC complete message to the base station in response to successfully connecting over the unlicensed wireless spectrum, the RRC complete message comprising at least one of:
   a radio capability of the apparatus,
   measurement results from one or more measurements performed by the apparatus with respect to the WLAN access point, or
   a second medium access control (MAC) address of the apparatus enabling the base station to implement inter protocol layer bindings,
   wherein user plane data transfer over the unlicensed wireless spectrum occurs after receipt of the RRC complete message, and wherein the apparatus is authenticated with the WLAN access point based on the first MAC address after receipt of the RRC complete message; and an intermediate Access Technology (inter-AT) scheduling layer between a radio link control (RLC) transmitter entity and first and second MAC scheduling entities of the apparatus, wherein the inter-AT scheduling layer acts transparently to the first MAC scheduling entity while interfacing with the second MAC scheduling entity such that the inter-AT scheduling layer presents itself to the RLC transmitter entity as another MAC scheduling entity in the Long-Term Evolution (LTE) network.

2. The apparatus of claim 1, wherein the apparatus comprises a Long-Term Evolution (LTE)-capable wireless portable electronic device, wherein the base station operates in an LTE network serving as a primary cell, and wherein the WLAN access point operates in an unlicensed WLAN serving as a secondary cell that belongs to the base station.

3. The apparatus of claim 2, further comprising:
a packet data convergence protocol (PDCP) layer; and
an RLC layer below the PDCP layer,
wherein the primary cell terminates the PDCP and RLC layers in a user plane configured for the user plane data transfer.

4. The apparatus of claim 2, further wherein:
the first MAC scheduling entity configured to schedule data in the LTE network, and
the second MAC scheduling entity configured to schedule data in the unlicensed WLAN.

5. The apparatus of claim 4, wherein the second MAC scheduling entity is further configured to inform the inter-AT scheduling layer of any MAC protocol data unit (PDU) data transfer issues such that the inter-AT scheduling layer minimizes RLC PDU loss rate by diverting RLC PDUs to the LTE network.

6. The apparatus of claim 1, further comprising:
a packet data convergence protocol (PDCP) layer;
a radio link control (RLC) protocol layer below the PDCP layer;
an intermediate Access Technology (inter-AT) scheduling layer below the PDCP layer and the RLC protocol layer;
and a logical link control (LLC) protocol layer below the inter-AT scheduling layer.

7. The apparatus of claim 1, wherein the apparatus is authenticated with the WLAN access point after receipt of the RRC complete message such that the user plane data transfer over the unlicensed wireless spectrum occurs without the apparatus performing any authentication procedure with the WLAN access point.

8. The apparatus of claim 1, wherein the unlicensed wireless spectrum comprises an Institute of Electrical and Electronic Engineers (IEEE) 802.11-compatible WLAN.

9. The apparatus of claim 1, wherein the control circuit is further configured to provide to the base station, via a second RRC-based message, information regarding at least one of:
present availability of the unlicensed wireless spectrum;
signal level as corresponds to the unlicensed wireless spectrum;
signal quality as corresponds to the unlicensed wireless spectrum; or
estimated throughput as corresponds to the unlicensed wireless spectrum.

10. The apparatus of claim 1, wherein the RRC-based message includes at least one of an identity of the unlicensed wireless spectrum transceiver or information regarding capabilities of the unlicensed wireless spectrum transceiver.

11. A method implemented by a control circuit of a wireless device that operably couples to a cellular wireless transceiver employing licensed wireless spectrum to communicate with a base station and to an unlicensed wireless spectrum transceiver that employs unlicensed wireless spectrum to communicate with a Wireless Local Area Network (WLAN) access point, the method comprising:
transmitting, to the base station, a first identifier comprising a medium access control (MAC) address of the unlicensed wireless spectrum transceiver;
receiving, from the base station, a Radio Resource Control (RRC)-based message to cause the control circuit to connect to the WLAN access point;
associating with the WLAN access point in response to the RRC-based message having been received;
transmitting an RRC complete message to the base station in response to successfully connecting over the unlicensed wireless spectrum, the RRC complete message comprising a radio capability of the wireless device, wherein user plane data transfer over the unlicensed spectrum occurs after receipt of the RRC complete message, and wherein the wireless device is authenticated with the WLAN access point based on the MAC address after receipt of the RRC complete message; and
acting, via an intermediate Access Technology (inter-AT) scheduling layer of the wireless device located between a radio link control (RLC) transmitter entity and first and second MAC scheduling entities of the wireless device, transparently to the first MAC scheduling entity while interfacing with the second MAC scheduling entity such that the inter-AT scheduling layer presents itself to the RLC transmitter entity as another MAC scheduling entity in the Long-Term Evolution (LTE) network.

12. The method of claim 11, wherein the control circuit comprises a Long-Term Evolution (LTE)-capable wireless portable electronic device.

13. The method of claim 11, wherein the unlicensed wireless spectrum comprises an Institute of Electrical and Electronic Engineers (IEEE) 802.11-compatible wireless local area network.

14. The method of claim 11, further comprising providing to the base station, via a second RRC-based message, information regarding at least one of:
present availability of the unlicensed wireless spectrum;
signal level as corresponds to the unlicensed wireless spectrum;
signal quality as corresponds to the unlicensed wireless spectrum; or
estimated throughput as corresponds to the unlicensed wireless spectrum.

15. The method of claim 11, wherein the RRC-based message includes at least one of an identity of the unlicensed wireless spectrum transceiver or information regarding capabilities of the unlicensed wireless spectrum transceiver.

* * * * *